(12) United States Patent
Ojiro et al.

(10) Patent No.: US 6,772,581 B2
(45) Date of Patent: Aug. 10, 2004

(54) GAS TURBINE COOLING PASSAGES FOR BLADE RINGS, COMBUSTOR TRANSITION PIECE CONNECTING PORTIONS AND STATIONARY BLADES

(75) Inventors: Yasuhiro Ojiro, Takasago (JP); Kouichi Akagi, Takasago (JP); Ryotaro Magoshi, Takasago (JP); Hitoshi Morimoto, Takasago (JP); Shinya Hashimoto, Takasago (JP); Tadao Yashiki, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 31 days.

(21) Appl. No.: 09/748,158

(22) Filed: Dec. 27, 2000

(65) Prior Publication Data

US 2001/0023581 A1 Sep. 27, 2001

(30) Foreign Application Priority Data

Mar. 7, 2000 (JP) ........................................ 2000-062490

(51) Int. Cl.$^7$ ............................... F02C 3/00; F02C 7/12
(52) U.S. Cl. ...................... 60/39.182; 60/806; 415/114; 415/175
(58) Field of Search ..................... 60/806, 730, 39.182; 415/114, 173.5, 175–178, 134, 14

(56) References Cited

U.S. PATENT DOCUMENTS 5,205,115 A * 4/1993 Plemmons et al. ......... 415/115
5,685,693 A 11/1997 Sexton et al.
6,089,012 A * 7/2000 Sugishita et al. ......... 60/39.182
6,149,074 A * 11/2000 Friedel et al. ............... 165/169
6,367,242 B1 * 4/2002 Uematsu et al. ......... 60/39.182
6,390,769 B1 * 5/2002 Burdgick et al. ............ 415/116

FOREIGN PATENT DOCUMENTS

JP 2568645 10/1996

* cited by examiner

Primary Examiner—Charles G. Freay
(74) Attorney, Agent, or Firm—Wenderoth, Lind & Ponack, L.L.P.

(57) ABSTRACT

A gas turbine blade ring is cooled by steam whose temperature, pressure and flow rate are controlled so that a clearance between a moving blade tip and blade ring is maintained appropriately. Steam from a steam turbine bottoming cycle (10) flows into a blade ring cooling passage (8) of a gas turbine (1) via piping (12) for cooling the blade ring. The steam, having cooled the blade ring, is supplied into a transition piece cooling passage (9) of a combustor (3) for cooling the transition piece, and is then recovered into the steam turbine bottoming cycle (10) via piping (14). While the steam cools the blade ring, the temperature, pressure and flow rate of the steam are controlled so that thermal elongation of the blade ring is adjusted and the clearance at the moving blade tip is controlled so as to approach a target value. Thus, the clearance is maintained as small as possible in operation and the gas turbine performance is enhanced.

30 Claims, 16 Drawing Sheets

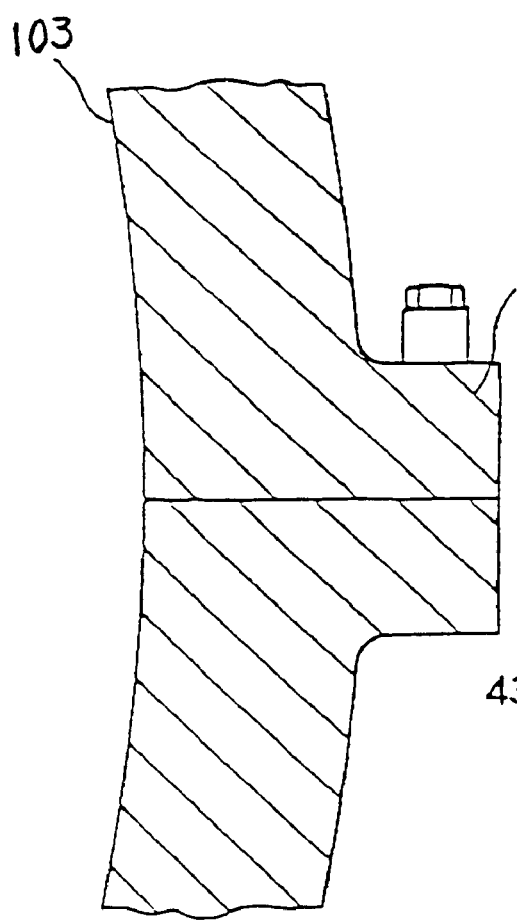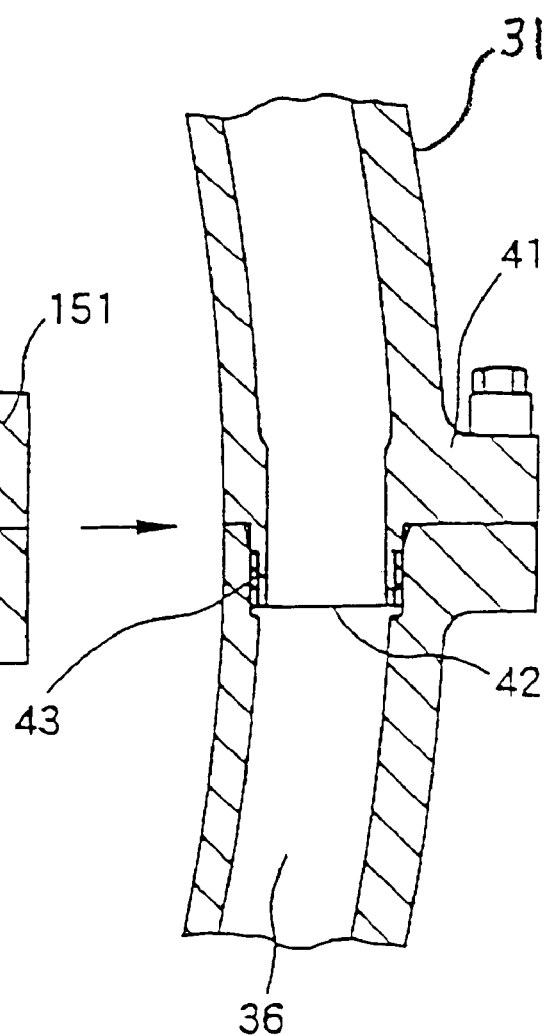

(Gas flow direction) →

GAS TURBINE COOLING PASSAGES FOR BLADE RINGS, COMBUSTOR TRANSITION PIECE CONNECTING PORTIONS AND STATIONARY BLADES

BACKGROUND OF THE INVENTION

1. Field of the Invention

The present invention relates generally to a gas turbine and more particularly to a gas turbine in which a blade ring, especially of first and second stages, is improved in shape so as to have less thermal influence and is cooled with less thermal expansion and uniform deformation by steam whose temperature, pressure and flow rate are controlled, so that a clearance at a moving blade tip is reduced in operation, thereby enhancing gas turbine performance.

2. Description of the Prior Art

FIG. 20 is a cross sectional view showing an interior of a representative gas turbine in the prior art. In FIG. 20, numeral 100 designates an outlet of a combustor transition piece, from which a high temperature combustion gas flows out. Numeral 101 designates a gas path, in which four stages of stationary blades 1C, 2C, 3C, 4C are arranged in an axial direction of the turbine. The stationary blades 1C, 2C, 3C, 4C are connected fixedly to blade rings 102, 103, 104, 105, respectively, via respective outer shrouds. Each of the stationary blades 1C, 2C, 3C, 4C includes a plurality of blades arranged in a circumferential direction of the turbine along respective inner walls of the blade rings 102, 103, 104, 105. Also, moving blades 1S, 2S, 3S, 4S are arranged in the axial direction alternately with the stationary blades 1C, 2C, 3C, 4C and each of the moving blades 1S, 2S, 3S, 4S is connected fixedly to a rotor 200 and includes a plurality of blades arranged in the circumferential direction around the rotor 200.

In the gas turbine of the above-mentioned construction, cooling of the blade is usually done by air such that the stationary blade is fed with cooling air from the blade ring side and the moving blade is fed with cooling air from the rotor side. Along with recent higher temperature gas turbines, however, is a tendency to employ a cooling system using steam. Also, at the time of start-up of the gas turbine, while there is maintained a predetermined clearance between a moving blade tip and a blade ring, the blade ring is still cold to shrink in the rise time and, on the other hand, the rotor and the moving blade are heated earlier. Hence, the clearance at the moving blade tip becomes smaller and a risk of contact in operation becomes higher. Accordingly, the clearance must be set appropriately taking this risk into consideration. If this clearance is too broad, it will reduce the gas turbine performance. Thus to make the clearance between the moving blade tip and the blade ring as small as possible is an effective means to enhance the gas turbine performance. But the present status is that such a countermeasure is not sufficiently established yet in the field of the industrial gas turbine.

As mentioned above, in the conventional industrial gas turbine, it is usual that cooling air is led into the gas turbine stationary blade, moving blade, rotor, etc. for cooling thereof. But, in the recent tendency to employ a higher temperature gas turbine, a steam cooling system is being used in place of the air cooling system. In such a gas turbine, the clearance between the moving blade tip and the blade ring changes due to thermal influences in the operation, beginning from the start-up time. The predetermined clearance at the start-up time becomes the minimum clearance state caused by a thermal elongation difference between the blade ring and the moving blade in the rise time, so that contact may arise, inviting a dangerous state unless an appropriate setting of the clearance is ensured. Also, if the clearance is too large in operation, it will invite a reduction in the gas turbine performance, so the appropriate setting of the tip clearance of the moving blade becomes necessary. For this purpose, it is preferable to make the tip clearance less changeable by heat as well as to make the tip clearance optimally controlled so as not to cause contact but, while such control is being variously studied, it is the present status that a sufficient art therefor is not established yet in the field of the industrial gas turbine.

SUMMARY OF THE INVENTION

In view of the mentioned problem in the prior art, it is an object of the present invention to provide a gas turbine in which a gas turbine blade ring is improved in structural shape so as to have less thermal influence and to have the blade ring made with a cooling system using steam in which the temperature, pressure and flow rate are controlled so that a clearance between a moving blade tip and the blade ring may be optimally set.

In order to achieve the mentioned object, the present invention provides the following (1) to (15):

(1) A gas turbine comprises a moving blade and a blade ring confronting a tip of the moving blade. A cooling passage is provided in the blade ring and an auxiliary boiler and a steam supply source connecting to a steam turbine bottoming cycle are connected to the cooling passage. Steam of the auxiliary boiler or the steam supply source flows into the cooling passage for cooling the blade ring and the steam having cooled the blade ring is recovered. Accordingly, a clearance between the tip of the moving blade and the blade ring is reduced.

(2) A gas turbine comprises a moving blade and a blade ring confronting a tip of the moving blade as well as a combustor and a transition piece contained in the combustor. A cooling passage is provided in the blade ring so that steam of a steam supply source flows into the cooling passage for cooling the blade ring and the steam having cooled the blade ring is flown into the transition piece via a combustor transition piece connection portion for cooling a wall interior of the transition piece. The steam having cooled the wall interior of the transition piece is recovered into the steam supply source. Accordingly, a clearance between the tip of the moving blade and the blade ring is reduced.

(3) A gas turbine comprises a moving blade and a blade ring confronting a tip of the moving blade as well as a combustor and a transition piece contained in the combustor. A cooling passage is provided in the blade ring so that steam of a steam supply source flows in parallel into the cooling passage for cooling the blade ring and into the transition piece via a combustor transition piece connection portion for cooling a wall interior of the transition piece. The steam having cooled the blade ring and the wall interior of the transition piece is recovered into the steam supply source. Accordingly, a clearance between the tip of the moving blade and the blade ring is reduced.

(4) A gas turbine comprises a first stage stationary blade and a first stage moving blade and a blade ring confronting a tip of the first stage moving blade as well as a combustor and a transition piece contained in the combustor. A blade ring cooling passage is provided in the blade ring and a stationary blade cooling passage is provided in the first stage stationary blade so as to connect to the blade ring cooling passage. Steam of a steam supply source flows into the blade ring cooling passage for cooling the blade ring and the steam having cooled the blade ring flows into the stationary blade cooling passage for cooling the first stage stationary blade. The steam having cooled the first stage stationary blade flows into the transition piece via a combustor transition piece connection portion for cooling a wall interior of the transition piece and the steam having cooled the wall interior of the transition piece is recovered into the steam supply source. Accordingly, a clearance between the tip of the first stage moving blade and the blade ring is reduced.

(5) A gas turbine comprises a first stage stationary blade, a first stage moving blade, a blade ring confronting a tip of the first stage moving blade as well a combustor and a transition piece contained in the combustor. A blade ring cooling passage is provided in the blade ring and a stationary blade cooling passage is provided in the first stage stationary blade so as to connect to the blade ring cooling passage. Steam of a steam supply source flows in parallel into the blade ring cooling passage for cooling the blade ring and into the stationary blade cooling passage for cooling the first stage stationary blade. The steam having cooled the first stage stationary blade flows into the transition piece via a combustor transition piece connection portion for cooling a wall interior of the transition piece. The steam having cooled the blade ring and the wall interior of the transition piece is recovered into the steam supply source. Accordingly, a clearance between the tip of the first stage moving blade and the blade ring is reduced.

(6) A gas turbine as mentioned in (2) above can have the following additional aspects. The blade ring is a blade ring confronting a tip of a first stage moving blade, the combustor is a plurality of combustors arranged in a turbine circumferential direction, there are provided in the blade ring a plurality of blocks protruding in a turbine axial direction from positions of the blade ring corresponding to positions of the plurality of combustors and, in each of the plurality of blocks, there is provided a U-shaped passage formed by turbine axial directional and circumferential directional passages. Steam flows into the U-shaped passage from one end of the U-shaped passage for cooling the blade ring and flows out of the other end of the U-shaped passage. The steam having cooled the blade ring is supplied into the transition piece via the combustor transition piece connection portion.

(7) A gas turbine as mentioned in (2) above can also have the following additional aspects. The blade ring comprises a first blade ring confronting a first stage moving blade and a second blade ring confronting a second stage moving blade. The cooling passage comprises a first cooling passage formed in the first blade ring and a second cooling passage formed in the second blade ring, and there are provided a turbine axial directional passage for connecting the first and second cooling passages to each other and a transition piece side passage for connecting the first cooling passage and the combustor transition piece connection portion to each other. The steam of the steam supply source flows sequentially in the second cooling passage, the turbine axial directional passage, the first cooling passage and the transition piece side passage, and is then supplied to the combustor transition piece connection portion.

(8) A gas turbine as mentioned in (7) above can have the following further aspects. The combustor transition piece connection portion comprises a transition piece cooling inlet connecting to the first cooling passage, a transition piece cooling outlet through which the steam having cooled the transition piece flows out and an outlet pipe manifold connecting to the transition piece cooling outlet.

(9) A gas turbine as mentioned in (7) above can also have the following additional aspects. Each of the first and second blade rings is formed such that upper and lower two separated semicircular portions of the blade ring are joined together at flanges provided on both side surface portions of the blade ring. There are provided a recessed portion or a protruded portion on an outer circumferential surface portion of the blade ring so as to fit to or fit in a portion of a turbine casing inner wall and another protruded portion on an inner circumferential surface portion of the blade ring so as to support a wall surface confronting the tip of the moving blade. A turbine axial directional cross sectional shape of the blade ring is approximately symmetrical relative to a turbine radial directional central axis in the turbine axial directional cross sectional shape of the blade ring.

(10) A gas turbine as mentioned in (7) above can also have the following additional aspects. Each of the first and second blade rings is formed such that two upper and lower separated semicircular portions of the blade ring are joined together at flanges provided on both side surface portions of the blade ring. In horizontal surface portions of the upper and lower semicircular portions of the blade ring so joined at the flanges, the cooling passage provided in the upper semicircular portion of the blade ring is extended so as to be inserted with a predetermined length into the cooling passage provided in the lower semicircular portion of the blade ring. A sealing material is interposed around the so-extended cooling passage of the upper semicircular portion of the blade ring.

(11) A gas turbine as mentioned in any one of (1) to (5) above can have the blade ring formed such that two upper and lower separated semicircular portions of the blade ring are joined together at flanges provided on both side surface portions of the blade ring. There are provided members, having masses substantially thermally equivalent to the flanges, on upper and lower portions of an outer circumferential surface portion of the blade ring.

(12) A gas turbine as mentioned in anyone of (1) to (5) above can have the blade ring provided with a plurality of steam inlets and steam outlets, respectively, arranged substantially evenly in vertical and horizontal directions on an outer circumferential surface portion of the blade ring.

(13) A gas turbine as mentioned in (7) above can have the blade ring be applied with a thermal shield made of a heat insulation material on its surface exposed to a high temperature space.

(14) A gas turbine as mentioned in any one of (1) to (5) above can have the blade ring provided therein with a plurality of sensors for sensing the clearance at the tip of the moving blade. The sensors are inserted from outside of a turbine casing to pass through the turbine casing and the blade ring so that sensing portions of the sensors may be exposed on an inner circumferential wall surface confronting the tip of the moving blade. There are provided a steam temperature controller arranged in a route for supplying the blade ring with steam from the steam supply source, a steam flow control valve arranged between the steam temperature controller and a steam inlet of the blade ring and a control unit taking signals from the sensors for comparison with a predetermined target value and controlling the steam temperature controller and an opening of the steam flow control valve so that the clearance may approach the target value.

(15) A gas turbine as mentioned in (14) above can have the sensors be FM electrostatic capacity type sensors.

The present invention is based on the inventions mentioned in (1) to (5) above. In the invention (1), firstly at the start-up time, steam from the auxiliary boiler is supplied into the cooling passage of the blade ring so that the blade ring which is cold during the rise time is heated and the clearance at the moving blade tip is enlarged, whereby contact at the minimum clearance during the rise time can be avoided. In the ordinary operation time, steam from the steam turbine bottoming cycle is supplied into the blade ring to cool the portion of the blade ring confronting the moving blade tip and, by setting the temperature, pressure and flow rate of the steam appropriately, thermal elongation of the blade ring is controlled so that the clearance at the moving blade tip may be set correctly. Whereby the gas turbine performance is prevented from being reduced by enlargement of the clearance.

In the invention (2), the blade ring is first cooled and the clearance at the moving blade tip can be controlled appropriately. Then the steam which has cooled the blade ring flows into the combustor transition piece to flow in the high temperature wall interior of the transition piece for cooling thereof and is recovered thereafter. Thus, the control of the clearance is carried out and the cooling of the transition piece by steam is also carried out, thereby contributing to the enhancement of the gas turbine performance.

In the invention (3), steam supply to the blade ring and to the transition piece are done in parallel, and the same effect as that of the invention (2) can be obtained. Further, there is no need to provide a steam supply passage from the blade ring to the transition piece. Rather, the steam is supplied into the transition piece independently, whereby the applicability of the cooling system is broadened and an appropriate cooling system can be selected according to the type of the gas turbine.

In the invention (4), the steam first cools the blade ring and then cools the stationary blade. The steam which has been temperature-elevated by the cooling cools the transition piece, which is a high temperature portion. Thus, not only the blade ring is cooled and the clearance at the moving blade tip is controlled, but also the stationary blade and the transition piece are cooled, thereby contributing to the enhancement of the gas turbine performance.

In the invention (5), steam supply to the blade ring and the stationary blade, and that to the transition piece, are done in parallel, and the same effect as that of the invention (4) can be obtained. Further, the cooling system is made such that the steam supply to the transition piece can be done by a separate system, whereby the applicability of the cooling system is broadened, and an appropriate cooling system can be selected according to the type of the gas turbine.

In the invention (6), the blade ring of the invention (2) is only the blade ring of the first stage, which receives the severest thermal influence, and the cooling passage is formed by the U-shaped passage in each of the blocks arranged corresponding to positions of the combustors. Thereby, inflow of the cooling steam to the transition piece and outflow therefrom of the cooling steam having cooled the transition piece, both via the combustor transition piece connection portion, are facilitated, and the structure therefor can be simplified.

In the invention (7), the blade ring of the invention (2) is divided into the first and second blade rings. The first and second blade rings are provided with the first and second cooling passages, respectively. The clearances at the tips of the first stage and second stage moving blades, respectively, can thereby be controlled by the steam-cooling of the blade rings, and the performance of the gas turbine of the invention (2) can be effectively further enhanced.

In the invention (8), supply of the cooling steam into the transition piece mentioned in the invention (7) is done easily through the transition piece cooling inlet of the combustor transition piece connection portion. The cooling steam having cooled the transition piece is taken out easily through the transition piece cooling outlet so as to be collected in the outlet pipe manifold, whereby the recovery of the steam can be done easily into the steam supply source from the outlet pipe manifold.

In the invention (9), the cross sectional shape of the blade ring is approximately symmetrical relative to the radial directional central axis thereof so as to be compact in shape. The fitting of the blade ring with the turbine casing inner wall is done easily via the recessed or protruded portion, whereby the deformation quantity of the blade ring can be made smaller and equalized. Further, by making the blade ring cross sectional shape compact, the fitting portion with the turbine casing is simplified and the diameter of the turbine casing in this area can be made smaller. Also, in the invention (10), at the flange connection portion of the upper and lower semicircular portions of the blade ring, the sealing material is interposed around the extended cooling passage of the upper semicircular portion of the blade ring and thereby steam leakage in this portion can be prevented. Also, in the invention (11), the members having the thermal balancing masses substantially equivalent to the flanges on both of the side surfaces of the blade ring are provided on the upper and lower portions of the blade ring, whereby distortion of the blade ring caused by heat can be made uniform and occurrence of unusual thermal stresses can be prevented. Also, in the invention (12), the steam inlets and steam outlets of the blade ring are arranged evenly as much as possible in the vertical and horizontal directions, whereby the thermal deformation is balanced and the thermal deformation quantity is made uniform. Also, in the invention (13), the thermal shield is applied to the surface of the blade ring exposed to the high temperature gas, whereby the thermal influence given to the blade ring can be lessened.

In the invention (14), the basic inventions of (1) to (5) above are supplemented with the sensors provided circumferentially in the blade ring for sensing the clearances at the tip of the moving blade and the signals of the clearances so sensed are inputted into the control unit. The control unit compares the clearance signals so sensed with the target value, which is stored in advance, and controls the steam temperature by the steam temperature controller and also controls the opening of the flow control valve so that the clearances may approach the target value. By such control, the steam temperature, pressure and flow rate can be adjusted easily, the clearances are set to the target value, and the gas turbine performance can be prevented from being reduced. Further, in the invention (15), the FM electrostatic capacity type sensor is used, whereby the clearance can be detected precisely, even in a high temperature state, in the range of 0 to 5 mm.

BRIEF DESCRIPTION OF THE DRAWINGS

FIGS. 9 are partial cross sectional views of a flange connection portion of the blade ring, wherein FIG. 9(a) shows a prior art example of the blade ring and FIG. 9(b) shows a representative example of the second blade ring of FIG. 5.

FIG. 10 are schematic views showing a further improvement, having thermal balancing in the blade ring of the second embodiment described with respect to FIGS. 5 and 6, wherein

FIG. 11 are front views of the blade ring, having steam inlets and steam outlets, of the second embodiment described with respect to FIGS. 5 and 6, wherein

DESCRIPTION OF THE PREFERRED EMBODIMENTS

Herebelow, embodiments according to the present invention will be described concretely with reference to figures.

Figure 1:
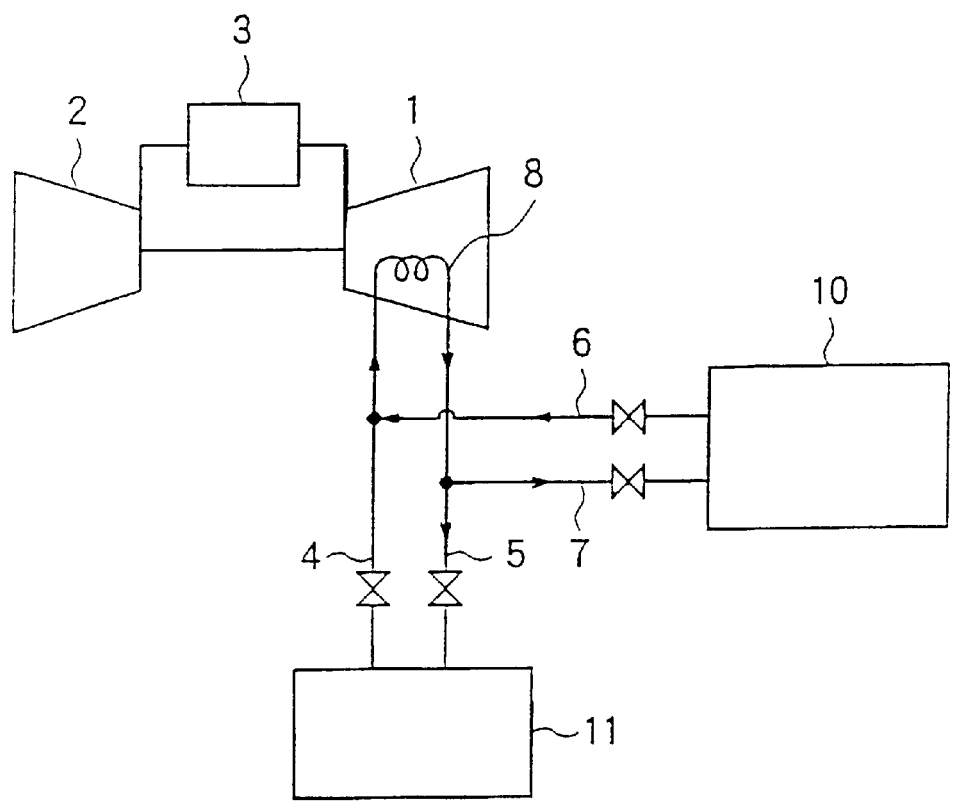
FIG. 1 is a constructional view of a gas turbine of a first embodiment according to the present invention.

FIG. 1 is a constructional view of a gas turbine of a first embodiment according to the present invention. In FIG. 1, numeral 1 designates a gas turbine, numeral 2 designates a compressor and numeral 3 designates a combustor. In the gas turbine 1, there is provided a blade ring cooling passage 8. Cooling steam coming from a steam turbine bottoming cycle 10 is supplied into the blade ring cooling passage 8 via a piping 6 for cooling a blade ring. The steam, after being used for the cooling, and having been heated, is returned to be recovered into the steam turbine bottoming cycle 10 via a piping 7. Also, at the rise time, steam of an appropriate temperature coming from an auxiliary boiler 11 is supplied into the blade ring cooling passage 8 via a piping 4 for cooling the blade ring. The steam, after being used for the cooling, is recovered into the auxiliary boiler 11 via a piping 5. The blade ring is so cooled by steam, whereby thermal elongation changes of the blade ring are adjusted so that a clearance between the blade ring and a moving blade may not be enlarged.

Figure 2:
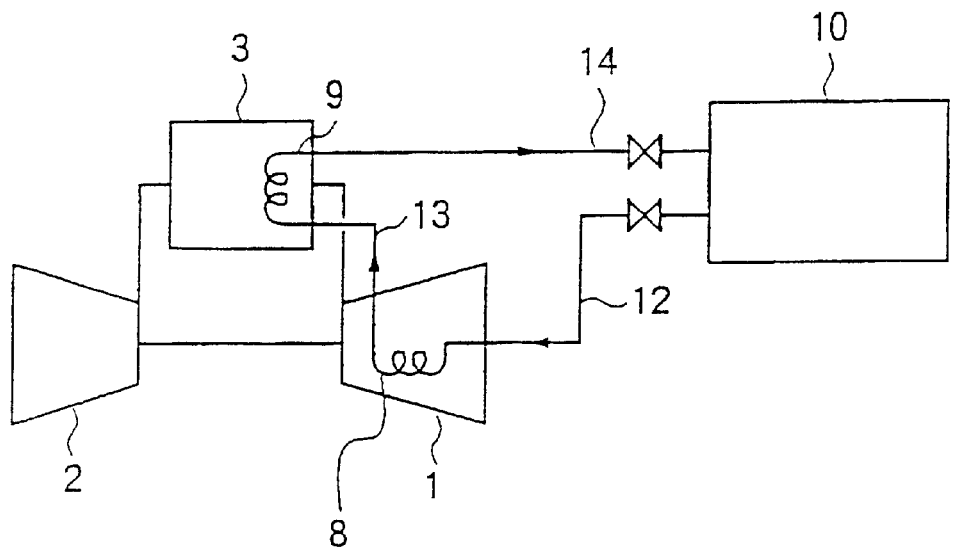
FIG. 2 is a constructional view of a gas turbine of a second embodiment according to the present invention.

FIG. 2 is a constructional view of a gas turbine of a second embodiment according to the present invention, wherein a cooling system of a gas turbine blade ring and that of a gas turbine combustor transition piece are connected in series with each other. In FIG. 2, cooling steam coming from a steam turbine bottoming cycle 10 is first supplied into a blade ring cooling passage 8 via a piping 12 for cooling the blade ring. The steam, after being used for the cooling, enters a transition piece cooling passage 9 of a combustor 3 via a piping 13 for cooling the transition piece. The steam having cooled the transition piece is recovered into the steam turbine bottoming cycle 10 via a piping 14.

Figure 3:
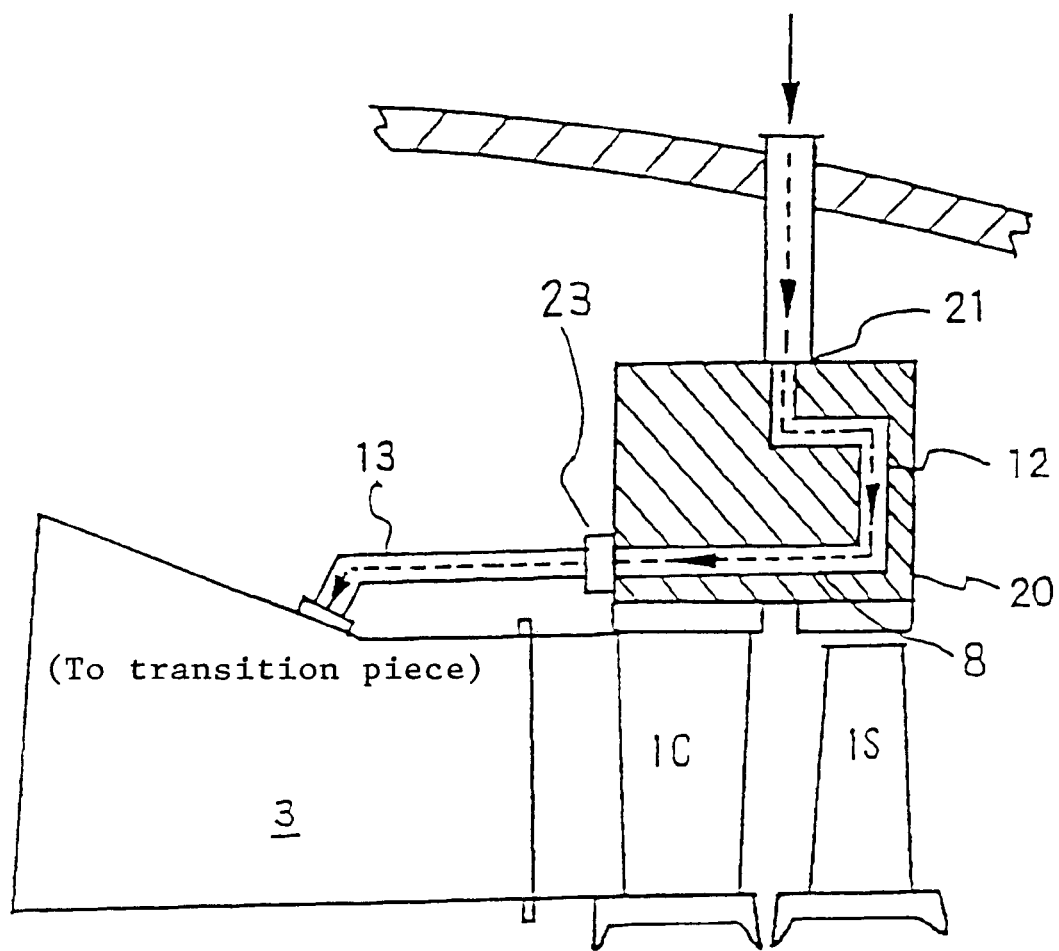
FIG. 3 is a schematic cross sectional view showing a blade ring cooling structure and a cooling steam passage of the gas turbine of the second embodiment of FIG. 2.

FIG. 3 is a schematic cross sectional view showing a blade ring cooling structure and a cooling steam passage of the gas turbine of the second embodiment of FIG. 2. Steam-cooling is applied to the blade ring of a first stage moving blade, which receives the severest thermal influence in the gas turbine. The steam, having cooled the blade ring flows into the transition piece for cooling thereof.

In FIG. 3, there is provided a blade ring 20 of the gas turbine, being fixed to a turbine casing inner wall and surrounding a first stage moving blade 1S. A steam inlet 21 is provided in the blade ring 20 and cooling steam flows through the steam inlet 21 to be supplied into the blade ring 20 via the piping 12. The cooling steam supplied into the blade ring 20 flows through the blade ring cooling passage 8 for cooling the blade ring 20 and the steam having cooled the blade ring 20 flows through the piping 13 to be led into the transition piece cooling passage 9 of the combustor 3. The steam having cooled the transition piece is recovered via a piping which is not shown.

Figure 4:
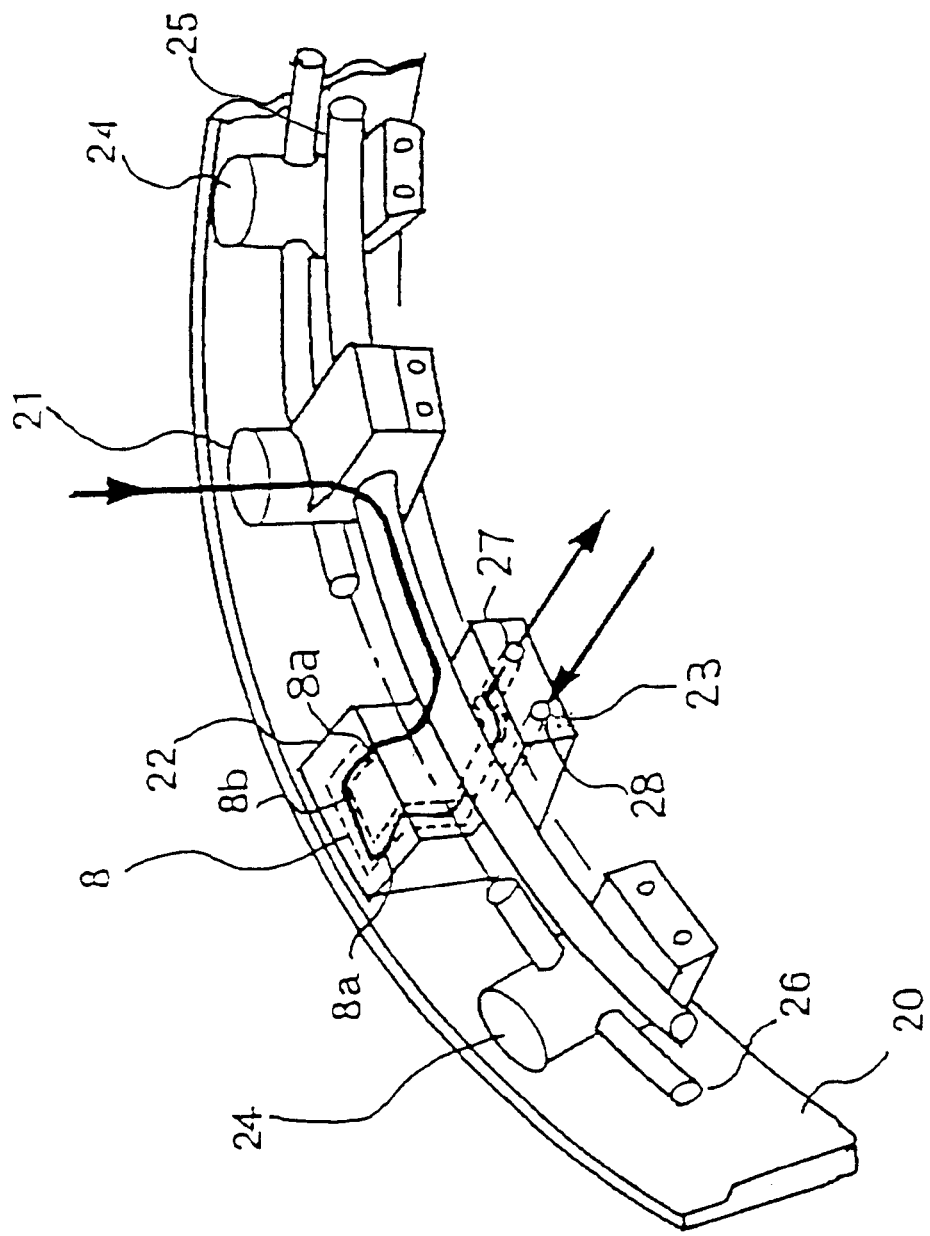
FIG. 4 is a partially cut-out perspective view showing the blade ring cooling structure and cooling steam passage of the gas turbine of the second embodiment of FIG. 2.

FIG. 4 is a partially cut-out perspective view showing a cooling structure of the blade ring 20, which confronts the first stage moving blade 1S, of the gas turbine of the second embodiment of FIG. 2. In FIG. 4, there is provided a steam supply pipe 25 along an inner circumferential wall of the blade ring 20. The blade ring 20 as illustrated here shows only a semi-circular upper half portion thereof, wherein there are provided one steam inlet 21 and two steam outlets 24. The steam inlet 21 and each of the steam outlets 24 are connected with the steam supply pipe 25 and a steam recovery pipe 26, respectively. The steam supply pipe 25 bifurcates from the steam inlet 21 toward both side directions thereof and the pipe diameter thereof becomes gradually smaller downstream of the steam supply pipe 25. The reason for that is to maintain a uniformity in the steam flow pressure in the pipe as the steam flow rate becomes less toward the downstream side when the steam is supplied to a plurality of blade ring cooling portions 22, each being formed in a block shape.

Also, on the reverse side of the member of the blade ring cooling portion 22, there is formed a transition piece cooling system connection portion 23. This transition piece cooling system connection portion 23 is arranged in eight pieces circumferentially on the transition piece side of the blade ring 20 so as to be positioned corresponding to each of the combustors. In the transition piece cooling system connection portion 23, there are provided a hole 27 which connects to a steam inflow port of the transition piece and a hole 28 which connects to a steam outflow port of the transition piece.

In the cooling structure shown in FIG. 4, cooling steam flows in from the steam inlet 21 and, being bifurcated toward both sides thereof, enters the blade ring cooling passage 8 of the blade ring cooling portion 22. The blade ring cooling passage 8 comprises two passages 8a arranged in the axial direction of the turbine and a passage 8b arranged in the circumferential direction of the turbine. When the cooling steam flows therethrough, it cools the circumferential wall surface portion, confronting the moving blade, of the blade ring 20.

The cooling steam flows through the blade ring cooling passage 8 from one of the passages 8a to the passage 8b and further to the other of the passages 8a and then flows through the hole 27 of the transition piece cooling system connection portion 23 to enter the transition piece of the combustor (not shown) for cooling thereof. The steam having cooled the transition piece returns to the hole 28 of the transition piece cooling system connection portion 23 from the transition piece and then flows into the steam recovery pipe 26 to be recovered through the steam outlet 24.

Thus, in the gas turbine of the present second embodiment, the blade ring, confronting the moving blade, is cooled by steam so as to suppress thermal influences and, by controlling the flow rate, pressure and temperature of the steam appropriately, contact at the clearance portion between the blade ring and the moving blade tip is prevented and the clearance is maintained as small as possible in operation. Also, the steam having cooled the blade ring 20 is flown into the transition piece of the combustor 3, which is of a higher temperature, and thereby the transition piece is cooled effectively and the gas turbine performance can be enhanced.

Figure 5:
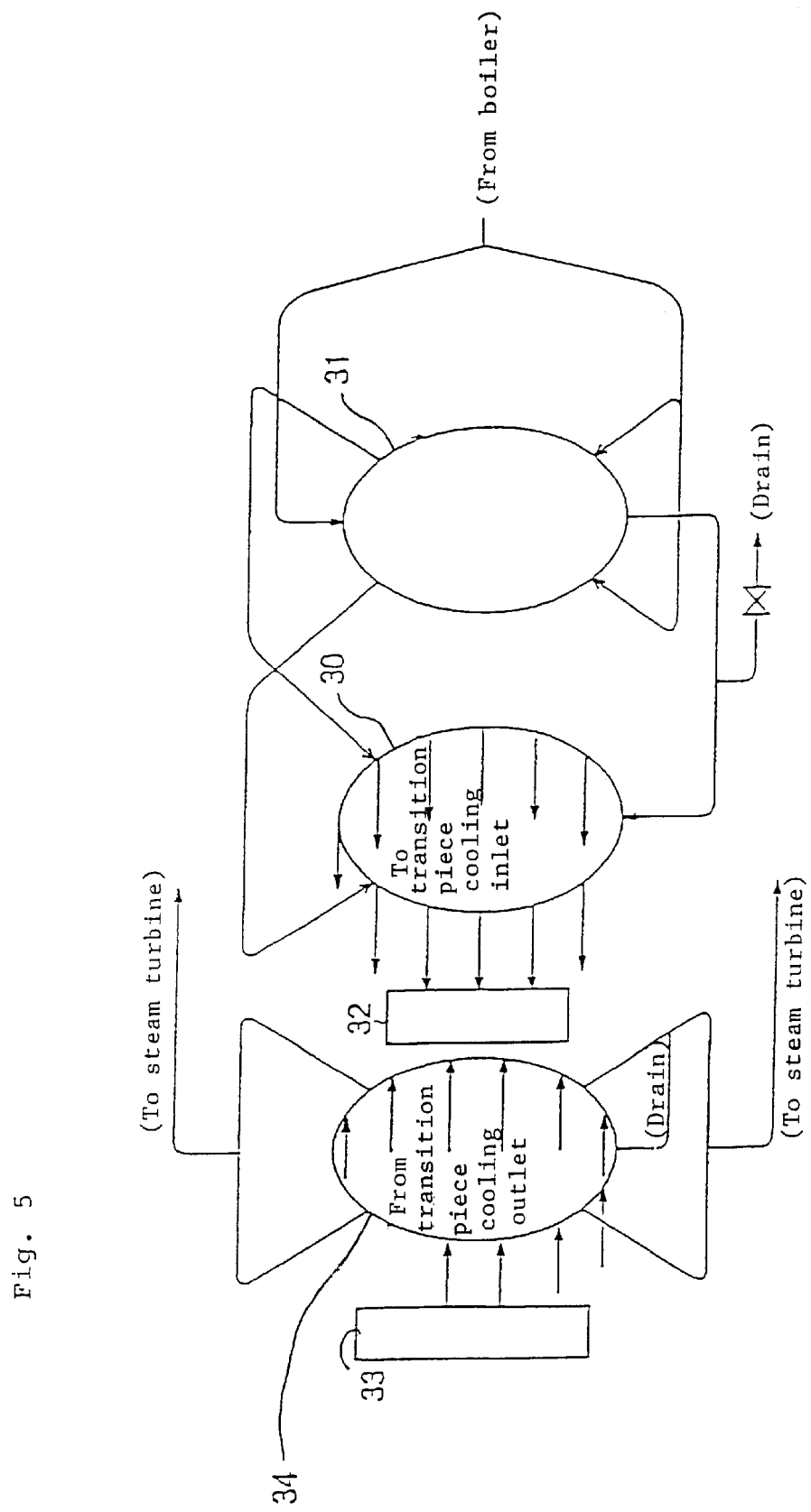
FIG. 5 is a system diagram showing another example of the blade ring cooling structure of the gas turbine of the second embodiment of FIG. 2.

FIG. 5 is a system diagram showing another example of the blade ring cooling structure of the gas turbine of the second embodiment of FIG. 2. In this example, independent blade rings confronting the first stage moving blade and the second stage moving blade, respectively, are provided. That is, the structure is such that the conventional blade ring, made in an integral structure, is separated, so that respective blade rings are featured in a shape having less thermal influence.

In FIG. 5, cooling steam coming from a boiler first flows into a second blade ring 31 for cooling thereof and then flows into a first blade ring 30 for cooling thereof. The steam having cooled the first and second blade rings 30 and 31 flows into a transition piece cooling inlet 32 to flow through a wall interior of the transition piece for cooling the transition piece. The steam having cooled the transition piece flows into an outlet pipe manifold 34 through a transition piece cooling outlet 33 and is recovered into a steam turbine.

Figure 6:
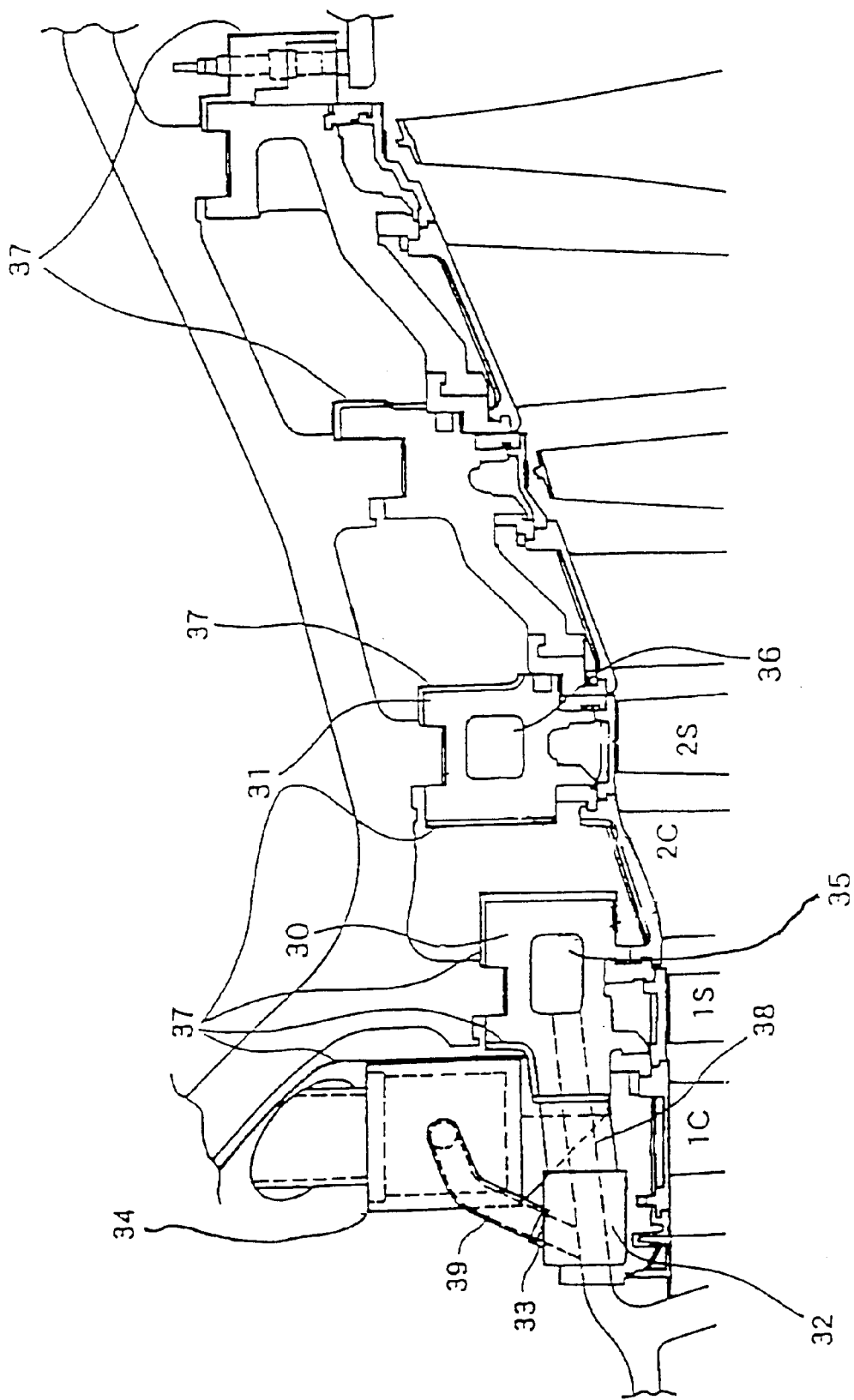
FIG. 6 is a cross sectional view showing a concrete structure of the blade ring cooling system of FIG. 5.

FIG. 6 is a cross sectional view showing a concrete structure of the blade ring cooling system shown in FIG. 5. In FIG. 6, the first blade ring 30 and the second blade ring 31 are separated from each other and the first blade ring 30 confronts the first stage moving blade 1S and the second blade ring 31 confronts the second stage moving blade 2S. In the blade rings 30 and 31, along the circumferential central portion thereof, there are provided blade ring cooling passages 35 and 36, respectively. The first blade ring 30 and the second blade ring 31 are connected to each other with three passages arranged in the axial direction of the turbine, as schematically shown in FIG. 5.

The blade ring cooling passage 35 in the first blade ring 30 is connected to the transition piece cooling inlet 32 with a plurality of passages 38 arranged in the axial direction. Steam is supplied into a wall interior of the transition piece through the passages 38 and the transition piece cooling inlet 32. The steam having cooled the transition piece flows through the transition piece cooling outlet 33, a piping 39 and further through the outlet pipe manifold 34, and is returned to a steam turbine. Also, on the circumferential surfaces and on both side surfaces thereof of the first and second blade rings 30 and 31, there are provided thermal shields 37 so that the blade rings 30 and 31 may be shielded from heat transferring in the axial direction.

Figure 7:
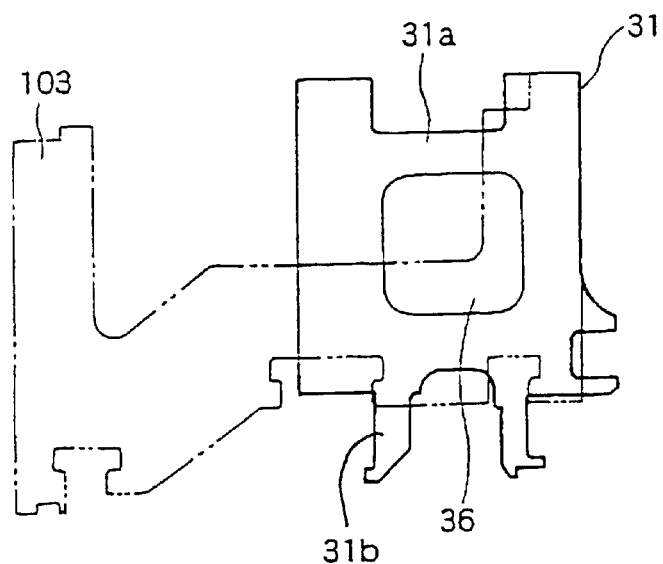
FIG. 7 is an enlarged view showing a shape of a second blade ring described with respect to FIGS. 5 and 6.

FIG. 7 is an enlarged view showing the second blade ring 31 described with respect to FIGS. 5 and 6. The second blade ring 31 is constructed such that a conventional blade ring 103 is separated into two parts so that one of the parts constitutes the second blade ring 31. The blade ring cooling passage 36 is formed in the second blade ring 31 along the circumferential interior central portion thereof. The second blade ring 31 comprises a recessed portion 31a which fits to a portion of the turbine casing wall and another recessed portion 31b which constitutes a fitting portion on the moving blade side. These recessed portions 31a and 31b, respectively, are formed approximately in a front and rear symmetrical shape relative to the turbine radial directional central axis of the second blade ring 31 in FIG. 7. By employing such construction of the central axis symmetry, the blade ring can be made compact in shape and the deformation quantity around the central axis can be made uniform.

The first blade ring 30 is also made with substantially the same construction, and description thereof will be omitted. By employing the first and second blade rings 30 and 31 constructed as mentioned above, the deformation quantity around the central axis thereof can be made uniform and smaller as compared with the conventional blade ring 103. It is to be noted that while the recessed portion 31a for fitting with the turbine casing wall is formed to be recessed toward the blade ring side in the illustration, this may be reversed. That is, the turbine casing side may be recessed and the blade ring side protrude so that the same central axis symmetry may be achieved.

Figure 8:
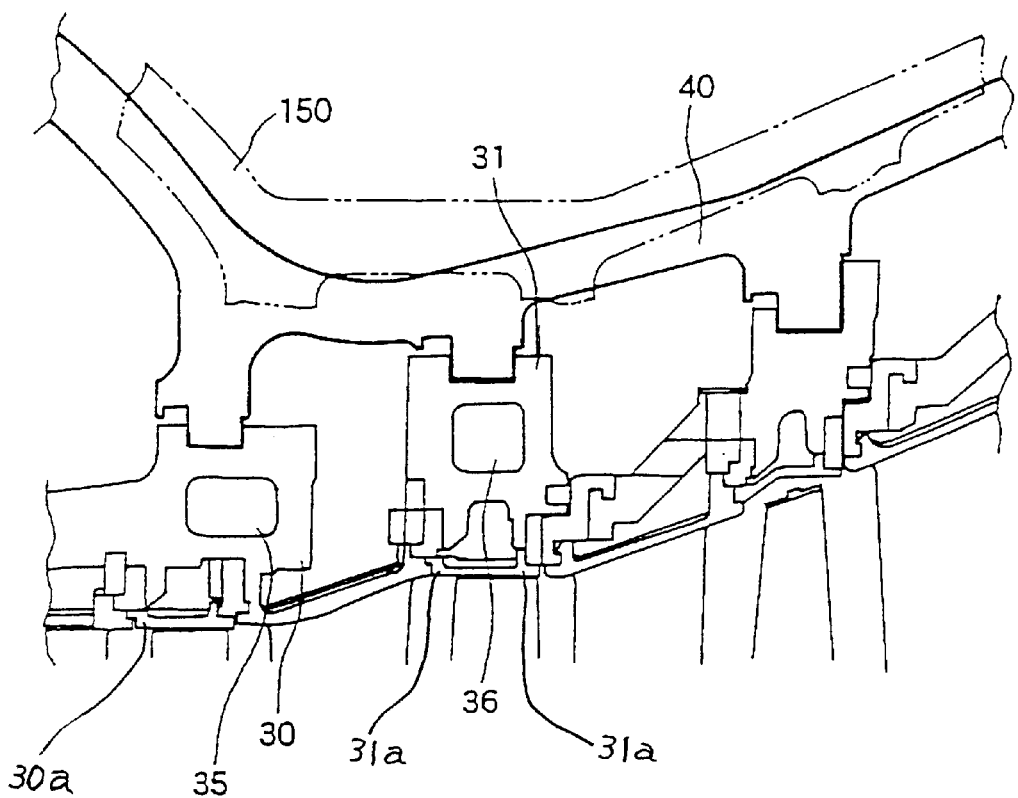
FIG. 8 is an enlarged view showing shapes of a turbine casing and the second blade ring described with respect to FIG. 6.

FIG. 8 is an enlarged view showing the turbine casing portion and the blade ring portion shown in FIG. 6. In FIG. 8, the first and second blade rings 30 and 31 are made compact in size and the steam cooled structure is employed, whereby a turbine casing 40 can be made smaller as compared with a conventional turbine casing 150. Also, the fitting portion with the turbine casing wall is moved toward the inner side of the turbine so that the turbine casing outer diameter may be made smaller and rigidity against thrust forces of the blade rings 30, 31 can be enhanced as compared with the conventional case. In FIG. 8, numeral 30a designates a first ring segment, which is a comparatively thin member fixed to the lower portion of the first blade ring 30 between the first blade ring 30 and the corresponding blade tip. Numeral 31a designates a second ring segment, which is formed and arranged, like the first ring segment 30a, between the second blade ring 31 and the corresponding blade tip. The clearance or gap between the blade ring and the blade tip is actually that between the ring segment and the corresponding blade tip.

FIG. 9 are cross sectional views of a flange connection portion of upper half and lower half portions of the blade ring. FIG. 9(a) shows a conventional example of the blade ring 103 and FIG. 9(b) shows a representative example of the second blade ring 31 of the second embodiment according to the present invention. As described with respect to FIG. 7, the blade ring 31 is structured so as to mitigate local stresses by making the blade ring 31 In the central axis symmetrical shape and making the thickness uniform, and also a flange 41 of the blade ring 31 is made thinner as compared with a flange 151 of the conventional example. By employing such construction, both of the turbine axial directional and circumferential directional deformation quantities can be made uniform. Further, the blade ring cooling passage 36 at the flange connection portion is connected via a connection portion 42, and a seal 43 is interposed around the connection portion 42.

Figure 10A:
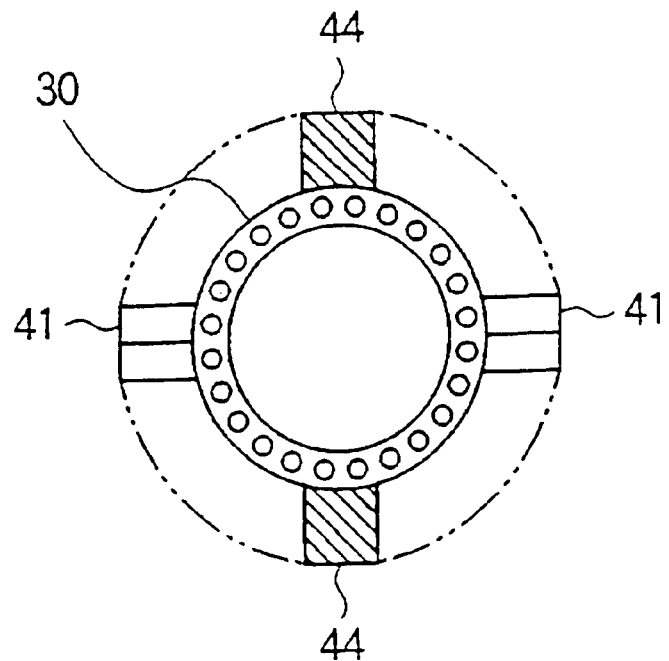
FIG. 10(a) is a front view of the blade ring and FIG. 10(b) is a side view of the blade ring.
Figure 10B:
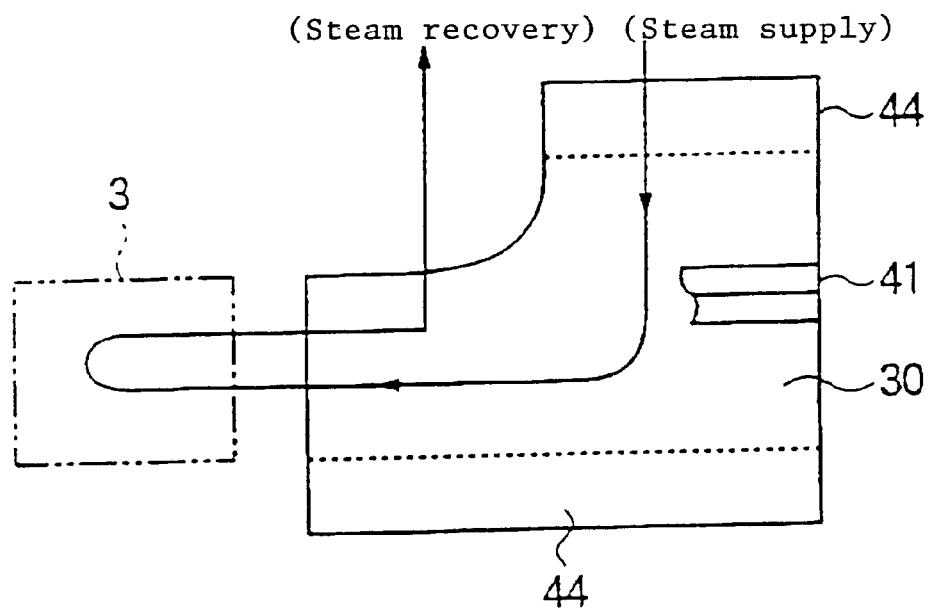

FIG. 10 are schematic views showing a further improvement in the blade ring of the second embodiment as described with respect to FIGS. 5 and 6, taking an example of the first blade ring 30. FIG. 10(a) is a front view of the blade ring and FIG. 10(b) is a side view of the same. In FIGS. 10(a) and (b), the upper half and lower half portions of the first blade ring 30 are fixed to each other via the horizontal flanges 41 provided on both sides of the blade ring 30. Steam flows in the first blade ring 30 for cooling thereof and then flows into the transition piece of the combustor 3 for cooling thereof and is recovered. On the top and bottom of the blade ring 30, there are provided thermal balancing masses 44. The thermal balancing masses 44 have equivalent masses to the horizontal flanges 41 so that the weight and shape may be made equivalent in the vertical and horizontal directions, whereby thermal changes may be balanced in the same directions.

Figure 11B:
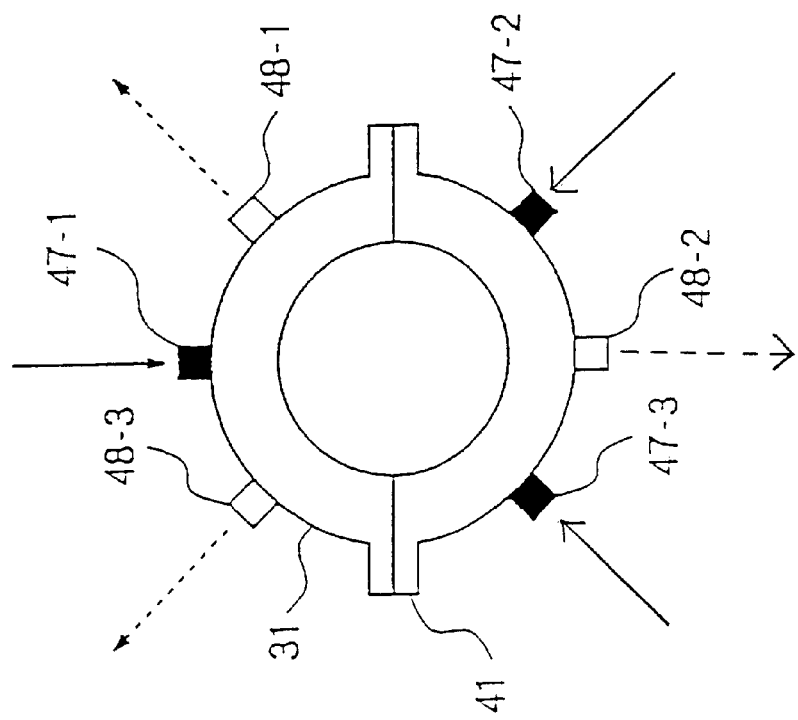
FIG. 11(a) shows an example having two steam inlets and four steam outlets and FIG. 11(b) shows an example having three steam inlets and three steam outlets.
Figure 11A:
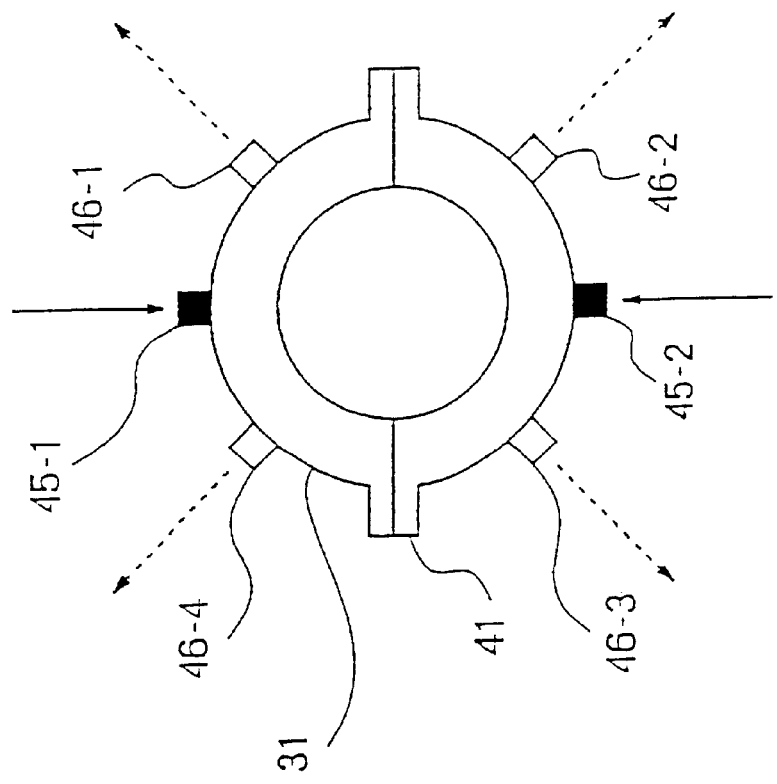

FIG. 11 are front views of the second blade ring 31 of the second embodiment described with respect to FIGS. 5 and 6, showing examples of arrangements of the steam inlet and outlet for effecting uniform and even thermal changes. FIG. 1(a) shows an example where two steam inlets and four steam outlets are arranged and FIG. 11(b) shows an example where three steam inlets and three steam outlets are arranged. In FIG. 11(a), the steam inlet through which steam enters the blade ring 31 is arranged as two steam inlets 45-1 and 45-2 at the top and bottom of the blade ring 31. The steam outlet through which the steam flows out of the blade ring 31 is arranged as four steam outlets, that is, two, 46-1 and 46-2, on the right hand side, and two, 46-3 and 46-4, on the left hand side of the blade ring 31. The construction is such that the arrangement of the steam inlets and outlets is balanced so as to realize a uniform and even cooling by steam, suppressing imbalances in thermal deformation.

The example of FIG. 11(b) is for a case where a larger flow rate of the steam is needed. The steam inlet is arranged as three steam inlets, that is, one, 47-1, on the top, and two, 47-2 and 47-3, on the lower side of the blade ring 31. The steam outlet is arranged also as three steam outlets, that is, two, 48-1 and 48-3, on the upper side, and one, 48-2, on the lower side of the blade ring 31. The flow of the steam is thereby made uniform, cooling of the blade ring by steam is equalized and the thermal deformation quantity can be made uniform.

Figure 12:
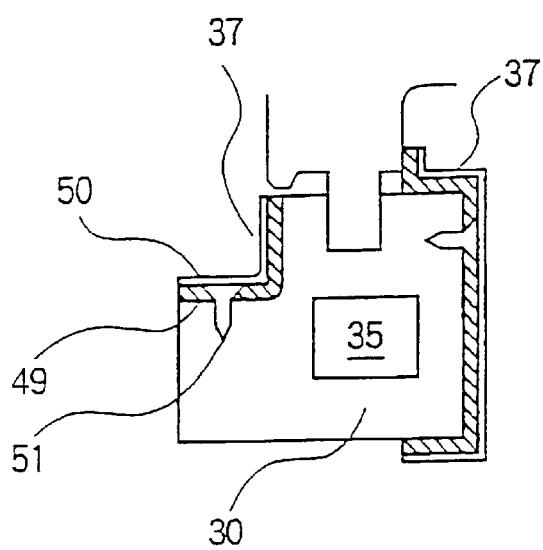
FIG. 12 is a cross sectional view of a first blade ring, having a thermal shield, of the second embodiment described with respect to FIGS. 5 and 6.

FIG. 12 is a cross sectional side view of the first blade ring 30 of the second embodiment described with respect to FIGS. 5 and 6, showing a concrete example of the thermal shield. In FIG. 12, a thermal shield 37 is provided mainly on the front and rear side surfaces of the blade ring 30 which face in the turbine axial direction. The thermal shield 37 is fitted to the surfaces of the blade ring 30 such that a heat insulating material 49 is fixed to the surfaces by a bolt 51. A cover 50 is applied to surfaces of the heat insulating material 49. By so applying the thermal shield 37 on the circumferential front and rear side surfaces of the blade ring 30, the blade ring 30 is shielded from high temperature heat transferring in the turbine axial direction and the effect of the steam-cooling is enhanced.

In the second embodiment as described above with respect to FIGS. 2 to 12, the cooling system is so made that the blade ring 20 is cooled by steam or the second blade ring 31 is first cooled and the first blade ring 30 is then cooled by steam and the steam having cooled the blade ring cools the transition piece. Also the construction is so that the blade ring 30 and 31 are made compact with a central axis symmetrical shape and the thermal shield 37 is applied as well as the thermal balancing mass 44 is fitted to the blade ring 30, 31 so as to ensure a balance in the thermal changes, or the arrangement of the steam inlet and outlet of the blade rings 30 and 31 are balanced in the vertical and horizontal directions of the blade ring 30, 31 so as to ensure a uniform cooling effect. By employing such construction, the blade ring confronting the moving blade is cooled effectively by steam and, by controlling the temperature, pressure and flow rate of the steam, the clearance at the moving blade tip is prevented from contacting at the rise time and also the clearance is maintained as small as possible during the operation. Thus, the gas turbine performance can be enhanced.

Figure 13:
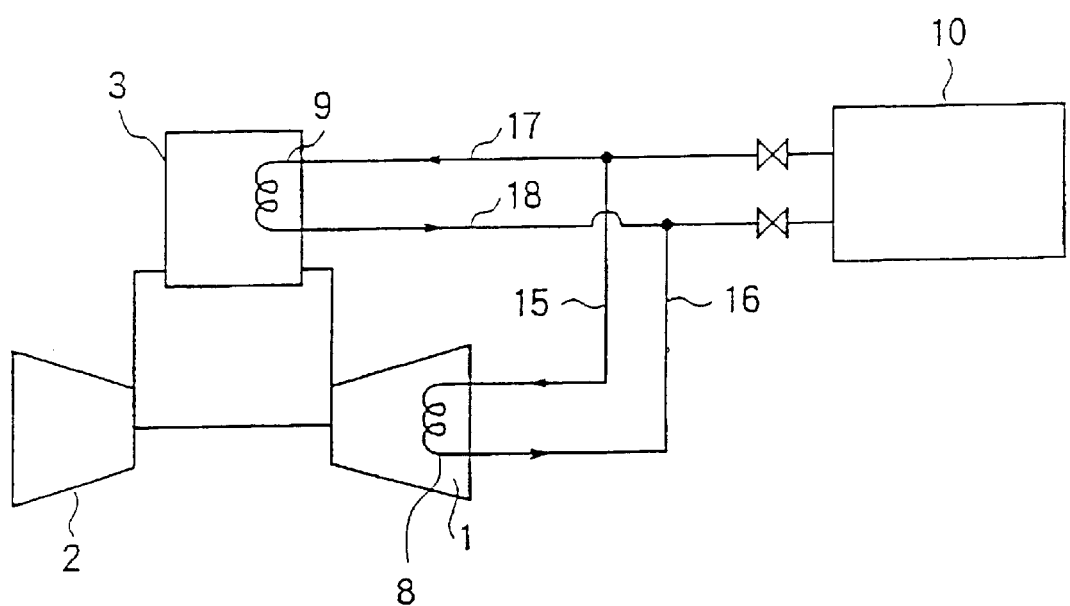
FIG. 13 is a constructional view of a gas turbine of a third embodiment according to the present invention.

Next, FIG. 13 is a constructional view of a gas turbine of a third embodiment according to the present invention. In FIG. 13, what is different from the second embodiment shown in FIG. 2 is that, while the second embodiment employs a series cooling system in which cooling steam first cools the blade ring of the gas turbine 1 and then cools the transition piece of the combustor 3, in the present third embodiment, the blade ring cooling passage 8 of the gas turbine 1 and the transition piece cooling passage 9 of the combustor 3 are connected in parallel to each other and the cooling steam flows into them concurrently. Other portions of the construction are the same as those of the second embodiment shown in FIG. 3.

In FIG. 13, cooling steam coming from the steam turbine bottoming cycle 10 flows in parallel into the transition piece cooling passage 9 of the combustor 3 via a piping 17 and into the blade ring cooling passage 8 of the gas turbine 1 via a piping 15, respectively. The steam, after being used for the cooling, flows from the transition piece via a piping 18 and from the blade ring via a piping 16 to be recovered into the steam turbine bottoming cycle 10. It is to be noted that, as to the present third embodiment also, except for the blade ring cooling structure, in which the cooling steam having cooled the blade ring is not supplied into the transition piece but is recovered as it is, the same concrete constructions shown in FIGS. 3 to 12 may be applied to the third embodiment as they are. In this case also, the same effect of the invention can be obtained.

Figure 14:
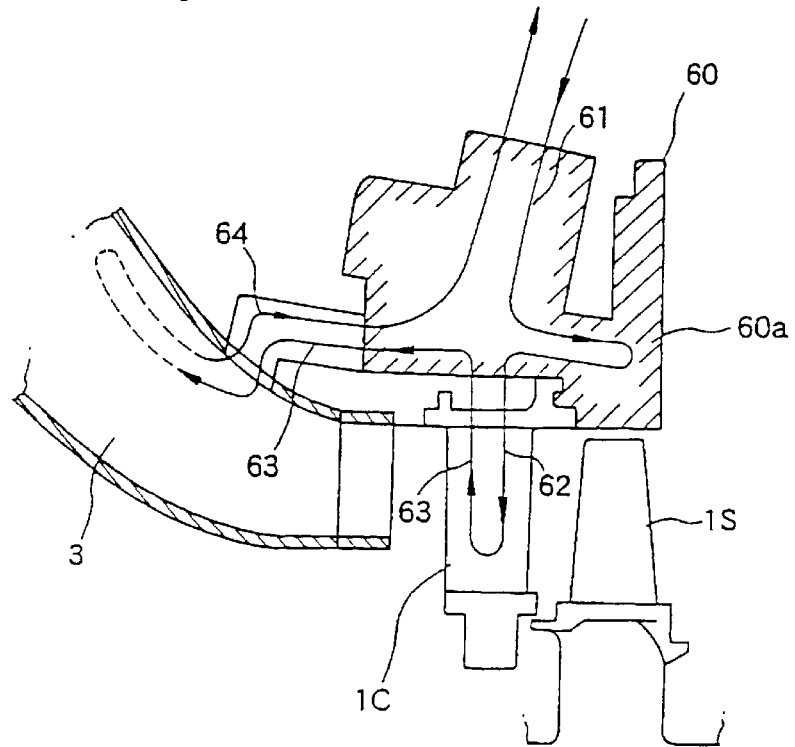
FIG. 14 is a constructional view of a gas turbine of a fourth embodiment according to the present invention.

FIG. 14 is a constructional view of a gas turbine of a fourth embodiment according to the present invention, wherein the cooling system of the blade ring and the transition piece is made such that cooling steam first cools the blade ring, which confronts the first stage moving blade 1S, and then cools the first stage stationary blade 1C. The steam further flows into the transition piece for cooling thereof and is then recovered.

In FIG. 14, cooling steam is led from a steam turbine bottoming cycle (not shown), like in FIGS. 1 and 2, via a passage 61 and enters a portion 60a, confronting the first stage moving blade 1S, of a blade ring 60 for cooling thereof. Cooling of this portion 60a, like in the example shown in FIG. 4, may be done by a cooling passage formed in a U-shape by the turbine axial directional and radial directional passages. The steam having cooled the portion 60a of the blade ring 60 flows into the first stage stationary blade 1C for cooling thereof via a passage 62 and then flows into the transition piece of the combustor 3 for cooling thereof via a passage 63 and is thereafter recovered via a passage 64.

In the fourth embodiment described above, like in the second embodiment, the blade ring is cooled by steam so that the clearance between the blade ring and the moving blade 1S may be adjusted to an appropriate gap. The transition piece is cooled by the steam having cooled the blade ring and, moreover, the steam before entering the transition piece cools the first stage stationary blade 1C as well. Hence, the cooling effect is enhanced and the gas turbine performance is also enhanced.

Figure 15:
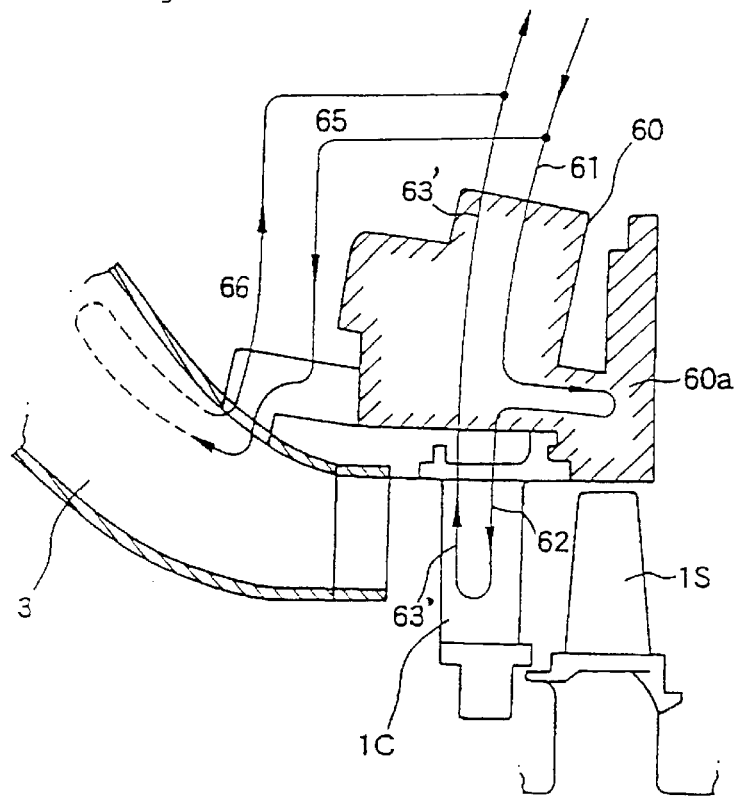
FIG. 15 is a constructional view of a gas turbine of a fifth embodiment according to the present invention.

FIG. 15 is a constructional view of a gas turbine of a fifth embodiment according to the present invention. If the fifth embodiment is compared with the fourth embodiment shown in FIG. 14, while in the fourth embodiment, cooling of the blade ring 60 and the stationary blade 1C and that of the transition piece are done sequentially in series, in the present fifth embodiment, cooling of the blade ring 60 and the stationary blade 1C and that of the transition piece are done in parallel. Other portions of the construction are same as those of the fourth embodiment of FIG. 14.

That is, in FIG. 15, cooling steam enters the blade ring 60 via the passage 61 for cooling the portion 60a of the blade ring 60 and then enters the stationary blade 1C for cooling thereof via the passage 62, and the steam having cooled the stationary blade 1C is recovered via a passage 63'. At the same time, the steam bifurcates from the passage 61 to enter the transition piece for cooling thereof via a passage 65 and is then recovered via a passage 66. Thus, cooling of the blade ring 60 and the stationary blade 1C and that of the transition piece are carried out in parallel. In the so-constructed fifth embodiment also, the same effect as that of the fourth embodiment can be obtained.

Figure 16:
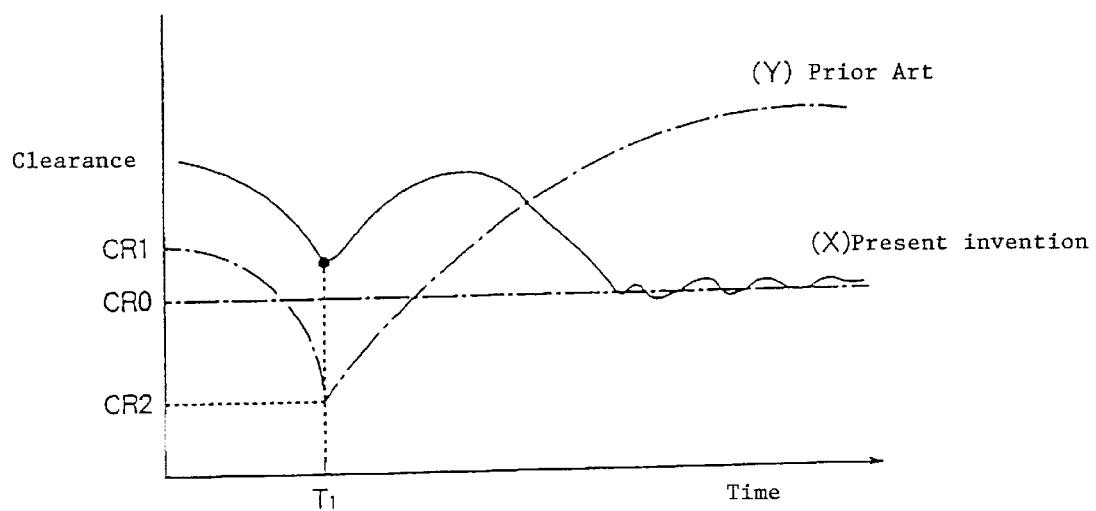
FIG. 16 is a view showing clearance characteristic curves for explaining a clearance control system applicable to the first to fifth embodiments according to the present invention.

Next, a clearance control system applicable to the first to fifth embodiments according to the present invention will be described with reference to FIGS. 16 to 19. FIG. 16 is a view showing clearance characteristic curves, wherein (X) shows the clearance characteristic curve when the clearance control system of the present invention is applied and (Y) shows the clearance characteristic curve in the prior art. In the curve (Y) of the conventional case, the initial clearance CR1 is 5 mm at a cold start time and 3 mm at a hot start time and also the minimum clearance CR2 at time T1 is 3 mm at the cold start time and 0.8 mm at the hot start time.

At the rise time of the operation, while the blade ring is cold, the moving blade is heated earlier so as to make a larger thermal elongation and the clearance is reduced so that the minimum clearance CR2 occurs at the time T1. In the characteristic curve (Y) of the conventional case, if the initial clearance CR1 is too small, then there contact occurs with the minimum clearance CR2 at the time T1, causing a dangerous state. Hence the initial clearance CR1 must be set with a certain allowance. In the conventional characteristic curve (Y), as the clearance increases in the operation, as shown in FIG. 16, if the initial clearance is made too large, then the clearance in the operation will become too large so that the gas turbine performance may be reduced.

On the contrary, in the characteristic curve (X) of the present invention, the blade ring is also heated at the rise time by steam of the auxiliary boiler, as shown in FIG. 1, so as to cause thermal elongation, and the initial clearance also becomes large. Hence, the minimum clearance at the time T1 becomes large, so that the risk of contact can be avoided. In operation, as described above with respect to the first to fifth embodiments, the blade ring is cooled by steam and the temperature, pressure and flow rate of the steam are controlled, as described later, so that the clearance may be set to an optimal target value CR0, which takes account of safety. Thereby the operation is done with the optimal clearance CR0 being maintained and the gas turbine performance is prevented from being reduced.

Figure 17:
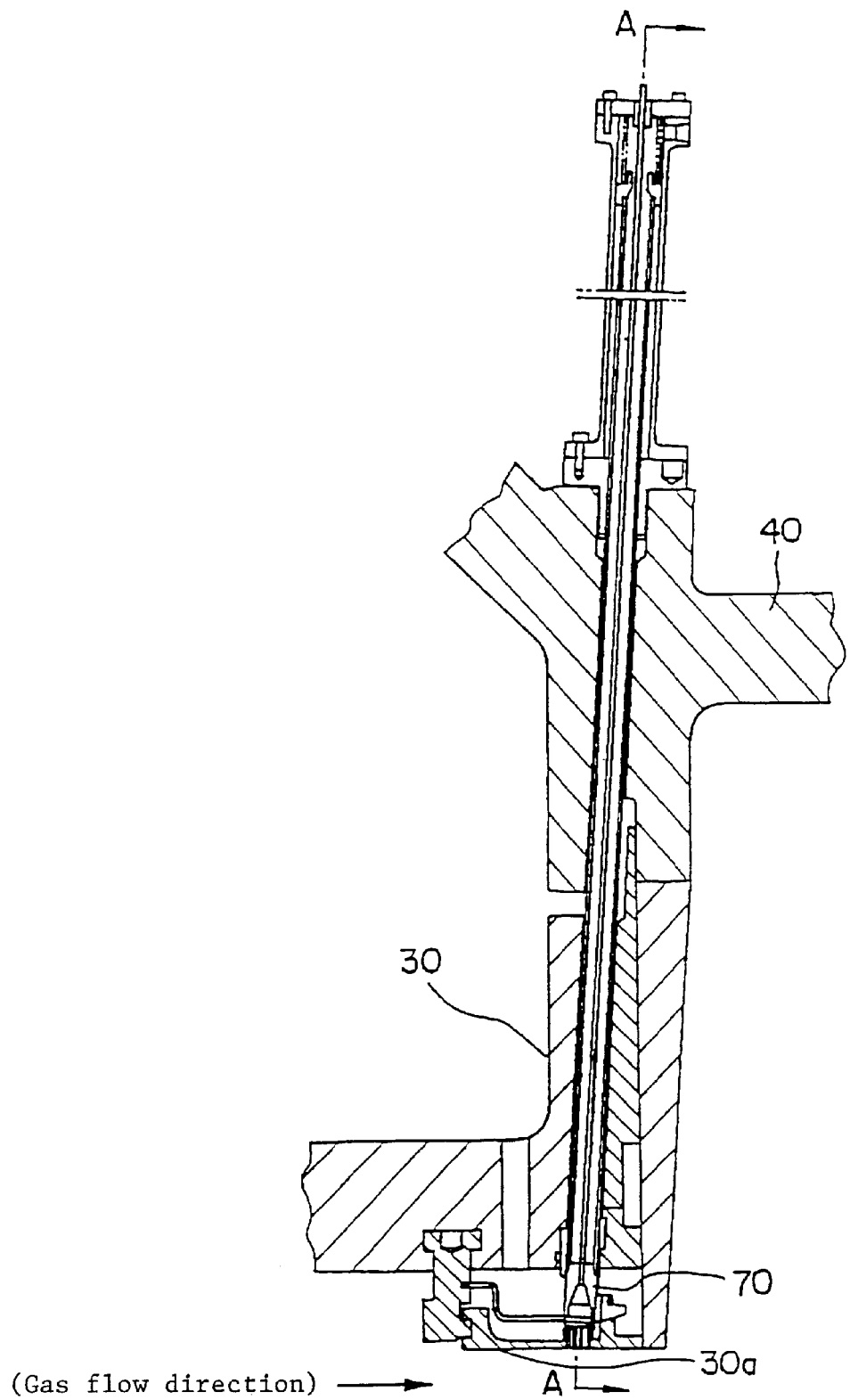
FIG. 17 is a cross sectional view of a gap sensor applicable to the clearance control system described with respect to FIG. 16.

FIG. 17 is a cross sectional view of a gap sensor applicable to the clearance control system of the blade ring described with respect to FIG. 16. In FIG. 17, a gap sensor 70 is inserted from outside of the turbine casing 40 to pass through the turbine casing 40 and the blade ring 30 and to be fitted so that a sensing portion of the gap sensor 70 may be exposed on a surface of a shroud 30a on the first stage moving blade side. The gap sensor 70 is an FM (frequency modulation) electrostatic capacity type sensor and has a measuring performance up to the maximum usable temperature of 1200° C. with an error of about 0.1 mm for the measuring range of 0 to 5.5 mm.

Figure 18:
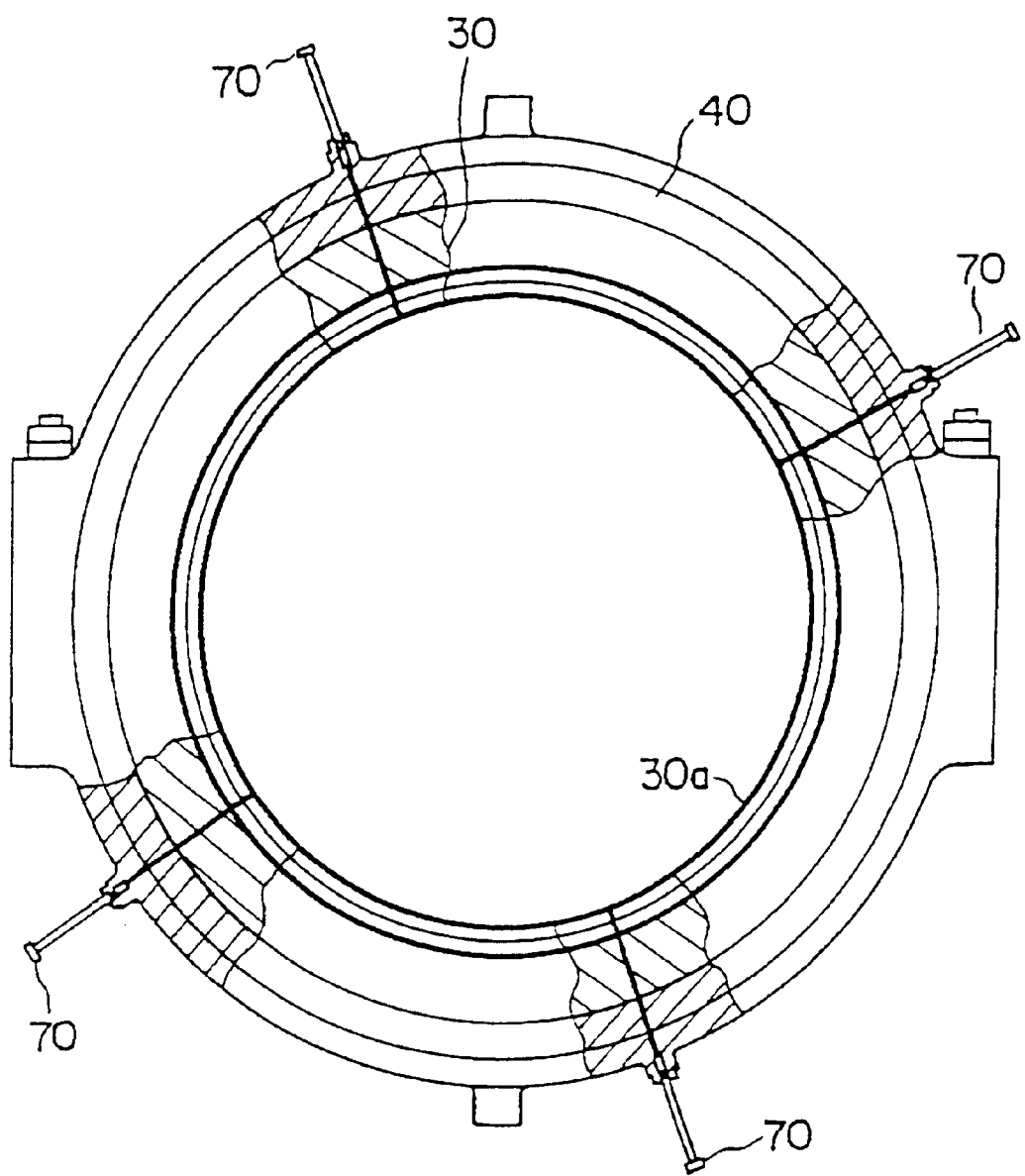
FIG. 18 is a front view of the blade ring including a cross sectional view taken on line A—A of FIG. 17.

FIG. 18 is a front view of the turbine casing and the blade ring, wherein each of the partially cut out portions shows a cross sectional view taken on line A—A of FIG. 17. As shown in FIG. 18, four gap sensors 70 are inserted from outside of the turbine casing 40 to pass through the turbine casing 40 and the blade ring 30. The sensing portion of the gap sensor 70 is exposed on the surface of the shroud 30a of the blade ring 30, which confronts the first stage moving blade. The gap at the moving blade tip is thereby detected at four places and the vertical directional and horizontal directional gaps of the blade ring are measured by the so detected four values so that the characteristic curve as shown in FIG. 16 can be obtained. It is to be noted that such measuring is likewise carried out at the gap at the second stage moving blade tip.

Figure 19:
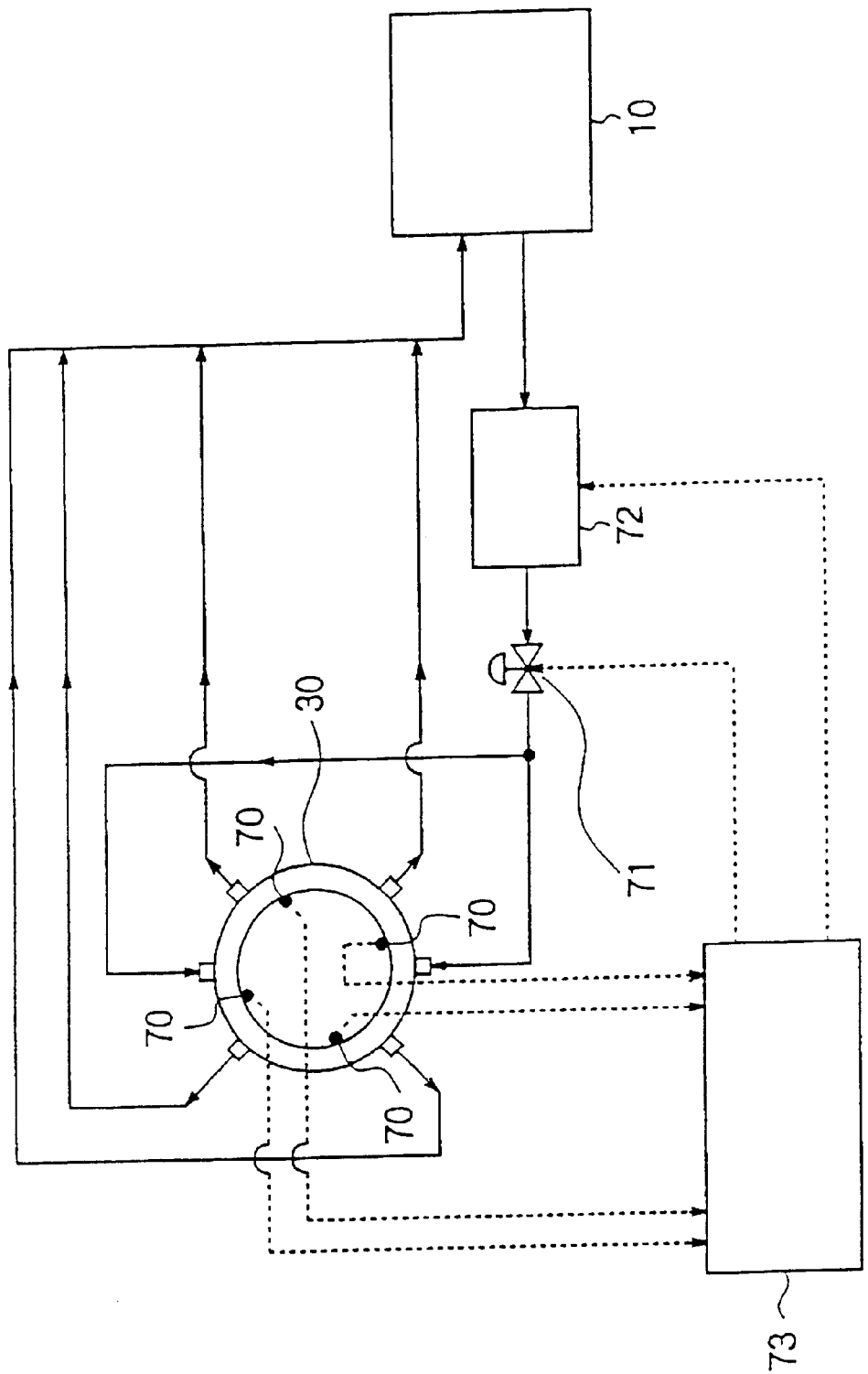
FIG. 19 is a control diagram of the clearance control system described with respect to FIG. 16.
Figure 20:
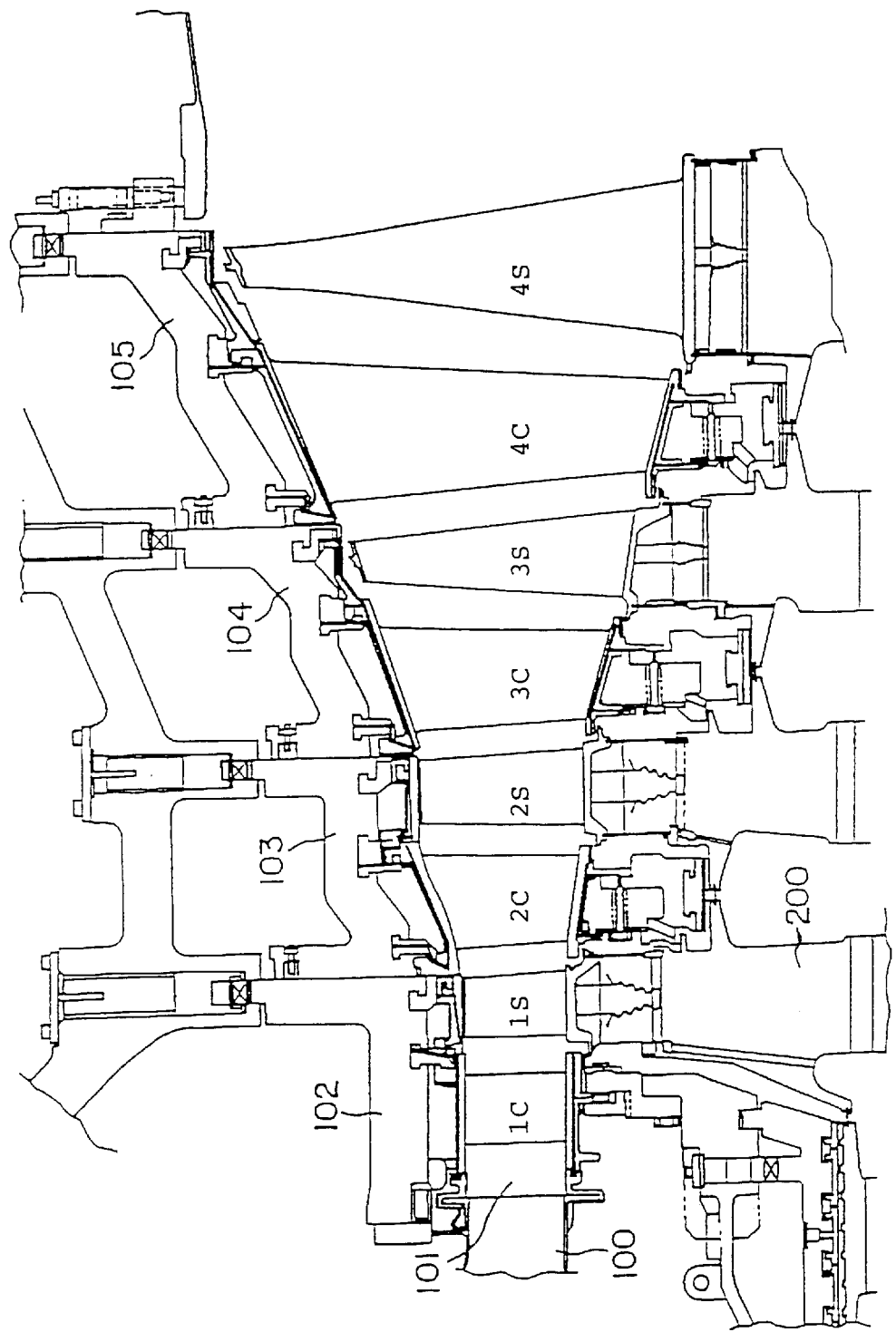
FIG. 20 is a cross sectional view showing an interior of a representative gas turbine in the prior art.

FIG. 19 is a control diagram of the clearance control system applicable to the first to fifth embodiments according to the present invention. In FIG. 19, steam coming from the steam turbine bottoming cycle 10 has its temperature controlled by a temperature controller 72 and has its pressure and flow rate controlled by a flow control valve 71 and then flows into the blade ring 30 for cooling thereof through two upper and lower steam inlets of the blade ring 30. The steam having cooled the blade ring 30 flows out of four steam outlets of the blade ring 30 to be recovered into the steam turbine bottoming cycle 10. Also, in the blade ring 30, there are provided the four gap sensors 70, as shown in FIG. 18, and thereby the clearance at the moving blade tip is measured and the signal thereof is inputted into a control unit 73.

The control unit 73 takes the signal from the gap sensor 70, and when the time T1 in the rise time, as shown in FIG. 16, has passed, the control unit 73 compares the signal with the optimal target value of the clearance, which is stored in advance, and thereby the opening of the flow control valve 71, and thus the pressure and flow rate of the steam, are controlled so that the clearance approaches to the target value. The temperature controller 72, and thus the temperature of the steam, are likewise controlled.

By controlling the temperature, pressure and flow rate of the steam at the control unit 73, conditions of the steam-cooling of the blade ring are variously changed so that the clearance may approach the optimal target value, as shown in FIG. 16, whereby the clearance can be set as small as possible and reductions in gas turbine performance due to enlargement of the clearance can be prevented.

While the preferred forms of the present invention have been described, it is to be understood that the invention is not limited to the particular constructions and arrangements herein illustrated and described, but embraces such modified forms thereof as come within the scope of the appended claims.

What is claimed is:

1. A gas turbine comprising:
a moving blade having a tip;
a blade ring confronting said tip of said moving blade; and
a cooling passage provided in said blade ring connected with an auxiliary boiler and a steam supply source connected to a steam turbine bottoming cycle so that steam from said auxiliary boiler or said steam supply source can flow into said cooling passage for cooling said blade ring and so that steam that has cooled said blade ring can be recovered, whereby a clearance between said tip of said moving blade and said blade ring can be reduced.

2. The gas turbine of claim 1, wherein:
said blade ring comprises separate semicircular portions that are joined together at flanges provided on side surface portions of said blade ring; and
members having masses that are thermally substantially equivalent to said flanges are provided on portions of an outer circumferential surface of said blade ring spaced from said flanges.

3. The gas turbine of claim 1, wherein said blade ring comprises a plurality of steam inlets and steam outlets that are substantially evenly arranged on an outer circumferential surface of said blade ring.

4. The gas turbine of claim 1, wherein:
said blade ring comprises a plurality of sensors for sensing the clearance between said tip of said moving blade and said blade ring, said plurality of sensors extending from outside of a turbine casing and through said turbine casing and said blade ring so that sensing portions of said plurality of sensors are exposed at an inner circumferential wall surface which confronts said tip of said moving blade;
a steam temperature controller is provided between the steam supply source and said blade ring;
a steam flow control valve is arranged between said steam temperature controller and a steam inlet of said blade ring; and
a control unit is provided to receive signals from said plurality of sensors for comparison with a predetermined target value and control said steam temperature controller and opening of said steam flow control valve so that the clearance may approach the target value.

5. The gas turbine of claim 4, wherein said plurality of sensors comprise FM electrostatic capacity sensors.

6. A gas turbine comprising:
a moving blade having a tip;
a blade ring confronting said tip of said moving blade;
a combustor having a combustor transition piece that has a wall interior;
a cooling passage provided in said blade ring for connection with a steam supply source so that steam from the steam supply source can flow into said blade ring for cooling of said blade ring; and
a combustor transition piece connection portion for conducting steam that has cooled said blade ring to said combustor transition piece to cool said wall interior, wherein steam that has cooled said combustor transition piece can be recovered into the steam supply source;
whereby a clearance between said tip of said moving blade and said blade ring can be reduced.

7. The gas turbine of claim 6, wherein:
said moving blade is a first stage moving blade;
said combustor comprises a plurality of combustors arranged in a circumferential direction of said turbine;
said blade ring comprises a plurality of blocks protruding in an axial direction of said turbine from positions of said blade ring corresponding to positions of said plurality of combustors; and
each of said plurality of blocks has a U-shaped passage formed by turbine axial directional passages and turbine circumferential directional passages such that steam can flow into said U-shaped passage from one end thereof for cooling of said blade ring and out of an other end of said U-shaped passage to said transition piece via said combustor transition piece connection portion.

8. The gas turbine of claim 6, wherein said blade ring comprises a first blade ring confronting a first stage moving blade and a second blade ring confronting a second stage moving blade, said cooling passage comprises a first cooling passage formed in said first blade ring and a second cooling passage formed in said second blade ring, a turbine axial directional passage connects said first cooling passage and said second cooling passage with each other, and a transition piece side passage connects said first cooling passage and said combustor transition piece connection portion with each other such that when steam is supplied from the supply source, it can flow sequentially in said second cooling passage, said turbine axial directional passage, said first cooling passage and said transition piece side passage to then be supplied to said combustor transition piece connection portion.

9. The gas turbine of claim 8, wherein said combustor transition piece connection portion comprises a transition piece cooling inlet connecting with said first cooling passage and a transition piece cooling outlet, connecting with an outlet pipe manifold, and through which steam that has cooled said transition piece can flow out.

10. The gas turbine of claim 8, wherein:
each of said first blade ring and said second blade ring comprises separate upper and lower semicircular portions that are joined together at flanges provided on side surface portions of said first blade ring and said second blade ring;
each of said first blade ring and said second blade ring comprises one of a protruded portion and a recessed portion on an outer circumferential portion thereof that fits with a portion of an inner wall of a turbine casing;
each of said first blade ring and said second blade ring comprises a protruded portion on an inner circumferential surface portion thereof so as to support a wall surface that confronts a respective said tip of said moving blade; and
a cross sectional shape of at least one of said first blade ring and said second blade ring, in an axial direction of said turbine, is approximately symmetrical with respect to a turbine radial direction that is central of said at least one of said first blade ring and said second blade ring.

11. The gas turbine of claim 8, wherein:
each of said first blade ring and said second blade ring comprises separate semicircular portions that are joined together at flanges provided on side surface portions of said first blade ring and said second blade ring, said separate semicircular portions having flat surfaces;
said cooling passage extends from said flat surface of one of said semicircular portion a predetermined length and is inserted into the other of said semicircular portions to continue said cooling passage therein; and a sealing material is interposed around said cooling passage where said cooling passage extends from said flat surface of the one of said semicircular portions.

12. The gas turbine of claim 8, wherein said blade ring comprises a thermal shield made of a heat insulation material located on a surface of said blade ring that is exposed to high temperature.

13. The gas turbine of claim 6, wherein:

said blade ring comprises separate semicircular portions that are joined together at flanges provided on side surface portions of said blade ring; and members having masses that are thermally substantially equivalent to said flanges are provided on portions of an outer circumferential surface of said blade ring spaced from said flanges.

14. The gas turbine of claim 6, wherein said blade ring comprises a plurality of steam inlets and steam outlets that are substantially evenly arranged on an outer circumferential surface of said blade ring.

15. The gas turbine of claim 6, wherein:

said blade ring comprises a plurality of sensors for sensing the clearance between said tip of said moving blade and said blade ring, said plurality of sensors extending from outside of a turbine casing and through said turbine casing and said blade ring so that sensing portions of said plurality of sensors are exposed at an inner circumferential wall surface which confronts said tip of said moving blade;

a steam temperature controller is provided between the steam supply source and said blade ring;

a steam flow control valve is arranged between said steam temperature controller and a steam inlet of said blade ring; and a control unit is provided to receive signals from said plurality of sensors for comparison with a predetermined target value and control said steam temperature controller and opening of said steam flow control valve so that the clearance may approach the target value.

16. The gas turbine of claim 15, wherein said plurality of sensors comprise FM electrostatic capacity sensors.

17. A gas turbine comprising:

a moving blade having a tip;

a blade ring confronting said tip of said moving blade;

a combustor having a combustor transition piece that has a wall interior;

a combustor transition piece connection portion communicating with said wall interior of said combustor transition piece;

a cooling passage in said blade ring; and a steam supply source communicating in parallel with said cooling passage in said blade ring for cooling said blade ring, whereby a clearance between said tip of said moving blade and said blade ring can be reduced, and said combustor transition piece connection portion so that steam can be supplied to said blade ring and to said combustor transition piece via said combustor transition piece connection portion for cooling said wall interior of said transition piece and so that steam that has cooled said wall interior and said blade ring can be wherein: recovered into said steam supply source;

said blade ring comprises separate semicircular portions that are joined together at flanges provided on said surface portions of said blade ring; and members having masses that are thermally substantially equivalent to said flanges are provided on portions of an outer circumferential surface of said blade ring spaced from said flanges.

18. A gas turbine comprising:

a moving blade having a tip;

a blade ring confronting said tip of said moving blade;

a combustor having a combustor transition piece that has a wall interior;

a combustor transition piece connection portion communicating with said wall interior of said combustor transition piece;

a cooling passage in said blade ring; and a steam supply source communicating in parallel with said cooling passage in said blade ring for cooling said blade ring, whereby a clearance between said tip of said moving blade and said blade ring can be reduced, and said combustor transition piece connection portion so that steam can be supplied to said blade ring and to said combustor transition piece via said combustor transition piece connection portion for cooling said wall interior of said transition piece and so that steam that has cooled said wall interior and said blade ring can be recovered into said steam supply source;

wherein said blade ring comprises separate semicircular portions that are joined together at flanges provided on side surface portions of said blade ring.

19. A gas turbine comprising:

a moving blade having a tip;

a blade ring confronting said tip of said moving blade;

a combustor having a combustor transition piece that has a wall interior;

a combustor transition piece connection portion communicating with said wall interior of said combustor transition piece;

a cooling passage in said blade ring; and a steam supply source communicating in parallel with said cooling passage in said blade ring for cooling said blade ring, whereby a clearance between said tip of said moving blade and said blade ring can be reduced, and said combustor transition piece connection portion so that steam can be supplied to said blade ring and to said combustor transition piece via said combustor transition piece connection portion for cooling said wall interior of said transition piece and so that steam that has cooled said wall interior and said blade ring can be recovered into said steam supply source;

wherein:

said blade ring comprises a plurality of sensors for sensing the clearance between said tip of said moving blade and said blade ring, said plurality of sensors extending from outside of a turbine casing and through said turbine casing and said blade ring so that sensing portions of said plurality of sensors are exposed at an inner circumferential wall surface which confronts said tip of said moving blade;

a steam temperature controller is provided between the steam supply source and said blade ring;

a steam flow control valve is arranged between said steam temperature controller and a steam inlet of said blade ring; and a control unit is provided to receive signals from said plurality of sensors for comparison with a predetermined target value and control said steam temperature controller and opening of said steam flow control valve so that the clearance may approach the target value.

20. The gas turbine of claim 19, wherein said plurality of sensors comprise FM electrostatic capacity sensors.

21. A gas turbine comprising:

a first stage stationary blade;

a first stage moving blade having a tip;

a blade ring confronting said tip of said first stage moving blade;

a combustor having a transition piece that has a wall interior;

a steam supply source;

a blade ring cooling passage in said blade ring connecting with said steam supply source for cooling said blade ring;

a stationary blade cooling passage in said first stage stationary blade connecting with said blade ring cooling passage so that steam that has cooled said blade ring can flow into said stationary blade cooling passage for cooling of said first stage stationary blade;

a combustor transition piece connection portion connecting said stationary blade cooling passage with said wall interior of said transition piece for cooling said wall interior with steam from said stationary blade cooling passage;

wherein steam from said wall interior can be recovered to said steam supply source;

whereby a clearance between said tip of said first stage moving blade and said blade ring can be reduced.

22. The gas turbine of claim 21, wherein:

said blade ring comprises separate semicircular portions that are joined together at flanges provided on side surface portions of said blade ring; and members having masses that are thermally substantially equivalent to said flanges are provided on portions of an outer circumferential surface of said blade ring spaced from said flanges.

23. The gas turbine of claim 21, wherein said blade ring comprises a plurality of steam inlets and steam outlets that are substantially evenly arranged on an outer circumferential surface of said blade ring.

24. The gas turbine of claim 21, wherein:

said blade ring comprises a plurality of sensors for sensing the clearance between said tip of said moving blade and said blade ring, said plurality of sensors extending from outside of a turbine casing and through said turbine casing and said blade ring so that sensing portions of said plurality of sensors are exposed at an inner circumferential wall surface which confronts said tip of said moving blade;

a steam temperature controller is provided between the steam supply source and said blade ring;

a steam flow control valve is arranged between said steam temperature controller and a steam inlet of said blade ring; and a control unit is provided to receive signals from said plurality of sensors for comparison with a predetermined target value and control said steam temperature controller and opening of said steam flow control valve so that the clearance may approach the target value.

25. The gas turbine of claim 24, wherein said plurality of sensors comprise FM electrostatic capacity sensors.

26. A gas turbine comprising:

a first stage stationary blade;

a first stage moving blade having a tip;

a blade ring confronting said tip of said first stage moving blade;

a combustor having a transition piece that has a wall interior;

a steam supply source;

a blade ring cooling passage in said blade ring;

a stationary blade cooling passage in said first stage stationary blade so as to connect to said blade ring cooling passage so that steam from said steam supply source can flow into said blade ring cooling passage for cooling said blade ring and into said stationary blade cooling passage for cooling said first stage stationary blade;

a combustor transition piece connection portion connecting said steam supply source with said wall interior of said transition piece for cooling said wall interior with steam flowing from said steam supply source in parallel with steam in said blade ring cooling passage and said stationary blade cooling passage;

wherein steam from said wall interior and from said blade ring can be recovered to said steam supply source;

whereby a clearance between said tip of said first stage moving blade and said blade ring can be reduced.

27. The gas turbine of claim 26, wherein:

said blade ring comprises separate semicircular portions that are joined together at flanges provided on side surface portions of said blade ring; and members having masses that are thermally substantially equivalent to said flanges are provided on portions of an outer circumferential surface of said blade ring spaced from said flanges.

28. The gas turbine of claim 26, wherein said blade ring comprises a plurality of steam inlets and steam outlets that are substantially evenly arranged on an outer circumferential surface of said blade ring.

29. The gas turbine of claim 26, wherein:

said blade ring comprises a plurality of sensors for sensing the clearance between said tip of said moving blade and said blade ring, said plurality of sensors extending from outside of a turbine casing and through said turbine casing and said blade ring so that sensing portions of said plurality of sensors are exposed at an inner circumferential wall surface which confronts said tip of said moving blade;

a steam temperature controller is provided between the steam supply source and said blade ring;

a steam flow control valve is arranged between said steam temperature controller and a steam inlet of said blade ring; and a control unit is provided to receive signals from said plurality of sensors for comparison with a predetermined target value and control said steam temperature controller and opening of said steam flow control valve so that the clearance may approach the target value.

30. The gas turbine of claim 29, wherein said plurality of sensors comprise FM electrostatic capacity sensors.

* * * * *